US009443065B1

(12) United States Patent
Schneider et al.

(10) Patent No.: US 9,443,065 B1
(45) Date of Patent: Sep. 13, 2016

(54) FACILITATING SECURITY ENFORCEMENT FOR SHARED CONTENT

(71) Applicant: Google Inc., Mountain View, CA (US)

(72) Inventors: Michael Patrick Schneider, Venice, CA (US); Justin Lewis, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/158,003

(22) Filed: Jan. 17, 2014

(51) Int. Cl.
*G06F 21/10* (2013.01)

(52) U.S. Cl.
CPC ..................................... *G06F 21/10* (2013.01)

(58) Field of Classification Search
CPC ........ G06F 21/10; G06F 21/60; G06F 21/44; H04L 63/101
See application file for complete search history.

(56) References Cited

U.S. PATENT DOCUMENTS

| | | |
|---|---|---|
| 2009/0216859 A1* | 8/2009 | Dolling ........................ 709/218 |
| 2011/0311199 A1 | 12/2011 | Fay et al. |
| 2012/0136936 A1 | 5/2012 | Quintuna |
| 2013/0208893 A1 | 8/2013 | Shablygin et al. |
| 2014/0189356 A1* | 7/2014 | Phegade et al. .............. 713/171 |

FOREIGN PATENT DOCUMENTS

WO   2012048347   4/2012

* cited by examiner

*Primary Examiner* — Izunna Okeke
(74) *Attorney, Agent, or Firm* — Fenwick & West LLP

(57) ABSTRACT

Systems and methods that relate to security enforcement for shared content are described. A system includes an interface component that facilitates a display of information indicative of an option to select a defined level of security for a first subset of content of a plurality of content, wherein the defined level of security is indicative of a first type of secure environment. The first type of secure environment can be a hypertext transfer secure (HTTPS) environment or any environment in which content is encrypted prior to transmission over the Internet. A security component determines an association between the first subset of content and the defined level of security; and generates decision information to facilitate output, to a device, of the first subset of content associated with the defined level of security based on a determination that the device provides the first type of secure environment.

15 Claims, 20 Drawing Sheets

ANNOTATIONS | ENHANCEMENTS | INFORMATION AND SETTINGS

VIDEO INFORMATION 210
CHANNEL: JOHN DOE
UPLOADED TIME: FEBRUARY 20, 2013
DURATION: 0:05
RAW FILE: 10839829383_612832.mp4
VIEWS: 04
LIKES: 0
DISLIKES: 0
COMMENTS:
VIDEO URL: http://www.youtube/llk.EP1a1-L0

PRIVACY SETTINGS 212
PRIVATE
ONLY ENTITIES YOU CHOOSE CAN SEE

GOOGLE.COM ⊗  214
+ ADD MORE PEOPLE

☑ RESTRICT TO SECURE PLAYBACK (HTTPS) ONLY 216

PEOPLE AND BLOGS ▶

CUSTOM THUMBNAIL
MAXIMUM FILE SIZE IS 2MB

TITLE 204 | VID 108392
DESCRIPTION 206
TAGS 208

UPLOAD 201
DETECTED CONTENT
CONTENT 116
CONTENT 118
CONTENT 120

FIG. 4

| CONTENT IDENTIFIER | SECURITY LEVEL SPECIFICATION | PRIVACY TYPE SPECIFICATION |
| --- | --- | --- |
| VID 108392 | HTTPS ONLY | EMPLOYEES WHO HAVE SIGNED A NON-DISCLOSURE AGREEMENT FOR TASK Q |
| VID 108394 | | |
| IMAGE 8822 | HTTPS ONLY | |
| VID 102987 | HTTPS ONLY | FULL-TIME EMPLOYEES OF COMPANY X |
| VID 168138 | | |

FIG. 6

FACILITATING SECURITY ENFORCEMENT FOR SHARED CONTENT

TECHNICAL FIELD

This disclosure relates to processing that facilitates security enforcement for shared content.

BACKGROUND

With advances in modern technology, numerous different types of content can be processed and/or provided to users via the Internet. Further, there is an increasing desire to efficiently and reliably disseminate sensitive content to users in various locations. Accordingly, security of content transmitted over the Internet is of utmost importance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods in this disclosure relate to processing that facilitates security enforcement for shared content. In one embodiment, a system includes: a memory storing computer executable components; and a processor configured to execute the following computer executable components stored in the memory. The components include an interface component that facilitates a display of information indicative of an option to select a defined level of security for a first subset of content of a plurality of content, wherein the defined level of security is indicative of a first type of secure environment. The components also include a security component that determines an association between the first subset of content of the plurality of content and the defined level of security.

In one embodiment, a method includes: determining, by a first device including a processor, information indicative of selection of an option associated with a defined level of security for a first subset of content of a plurality of content, wherein the defined level of security is indicative of a first type of secure environment; and determining an association between the first subset of content of the plurality of content with an indicator indicative of the defined level of security. For example, the first device can be a secure content component as described herein. The first subset of content can be restricted to playback on devices that provide the first type of secure environment. For example, the first subset of content can be restricted to playback on devices that provide the HTTPS environment.

In another embodiment, another method is provided. The method includes determining, by a first device including a processor, that a first subset of content of a plurality of content is viewable at a second device based on a determination that the second device provides a first type of secure environment, wherein the first subset of content is associated with information identifying the first type of secure environment. The method also includes generating decision information to facilitate outputting, to the second device, the first subset of content based on a determination of whether the second device provides a first type of secure environment. For example, the first device can be a secure content component as described herein and the second device can be a user device requesting content via the Internet for playback at the user device. As used in this disclosure, the term "user" (e.g., "user device") can refer to a person, entity, system, or combination thereof.

In another embodiment, another method is provided. The method includes: receiving, by a first device including a processor, information indicative of a defined level of security for content originating from a defined internet domain name, wherein the defined level of security is indicative of a first type of secure environment; and associating the subset of content with an indicator indicative of the defined level of security. For example, the first device can be a secure content component as described herein.

In another embodiment, another method is provided. The method includes: determining, by a first device including a processor, information indicative of selection of a first option associated with a defined controlled access parameter applicable to a subset of content of a plurality of content; and determining an association between the subset of content and the defined controlled access parameter.

In another embodiment, another method is provided. The method includes: determining, by a first device including a processor, that content selected for playback at the first device is associated with a defined level of security; determining, by the first device, whether the first device provides a first type of secure environment associated with the defined level of security; and requesting, by the first device, from a second device, the content for playback on the first device based on a determination that the first device provides the first type of secure environment. For example, the first device is a user device and the second device is the secure content component described herein.

Toward the accomplishment of the foregoing and related ends, the one or more embodiments include the features hereinafter fully described and particularly pointed out in the claims. The following description and the annexed drawings set forth in this disclosure detail certain illustrative aspects of the one or more embodiments. These aspects are indicative, however, of but a few of the various ways in which the principles of various embodiments can be employed, and the described embodiments are intended to include all such aspects and their equivalents.

DESCRIPTION OF THE DRAWINGS

FIGS. 2, 3 and 4 are illustrations of non-limiting user interfaces that facilitate security enforcement for shared content in accordance with one or more embodiments described herein.

FIG. 6 is an illustration of a non-limiting block diagram of a table that facilitates security enforcement for shared content in accordance with one or more embodiments described herein.

DETAILED DESCRIPTION

Figure 1:
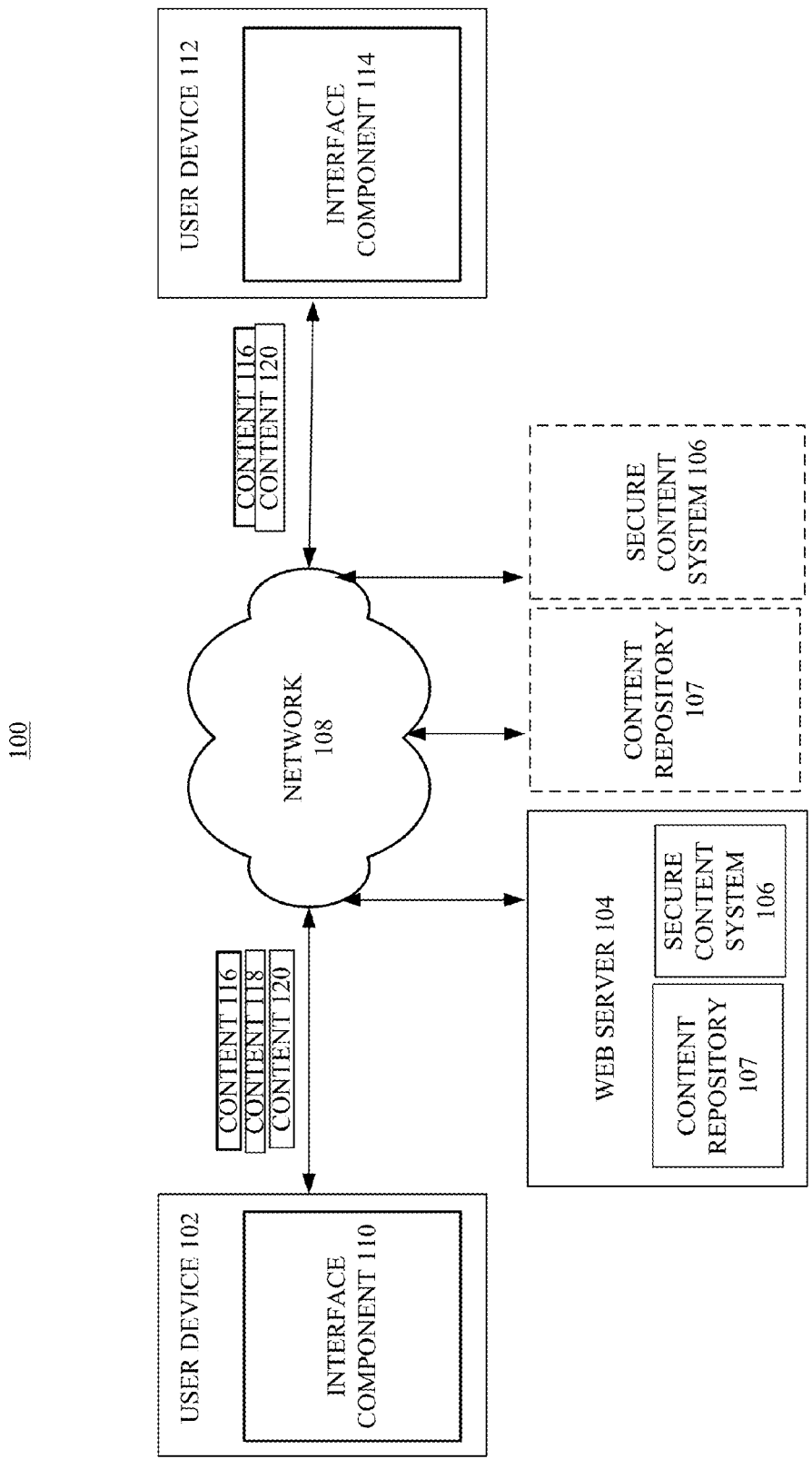
FIG. 1 is an illustration of a non-limiting block diagram of a system that facilitates security enforcement for shared content in accordance with one or more embodiments described herein.

Various embodiments are now described with reference to the drawings, wherein like reference numerals are used to refer to like elements throughout. In the following description, for purposes of explanation, numerous specific details are set forth in order to provide a more thorough understanding of one or more embodiments. It is evident, however, that such embodiments can be practiced without these specific details. In various instances, structures and devices are shown in block diagram form in order to facilitate describing one or more embodiments.

Companies and organizations often have internal documents, videos, and/or other digital assets that are private or secret. It is important to maintain privacy and security of these documents. With advances in modern technology, numerous different types of content can be processed and/or provided to users via the Internet. The different types of content have varying levels of sensitivity and call for corresponding levels of security.

One or more of the embodiments can advantageously provide security enforcement for shared content such that content is shared for playback at devices only if the device provides a Hypertext Transfer Protocol Secure (HTTPS) environment. HTTPS is a communications protocol for secure communication over a computer network (e.g., the Internet), which is provided by layering the Hypertext Transfer Protocol (HTTP) on the secure sockets layer (SSL)/transport layer security (TLS) encryption protocol. SSL is a public key encryption protocol employed by web servers, which deliver content that is accessed via the Internet. Typically HTTP communications are non-secure; however, layering of SSL and TLS provide encryption for the content transmitted via HTTP communication.

Accordingly, the security of HTTPS is dependent on the underlying TLS protocol, which uses long-term public and secret keys to exchange a short-term session key to encrypt the data flow between client and server. An important property in this context is perfect forward secrecy (PFS) so the short-term session key cannot be derived from the long-term asymmetric secret key; however, PFS is not widely adopted.

To increase the likelihood that the person with which a party is communicating is the intended person and not an imposter, X.509 certificates can be used. Specifically, certificate authorities and a public key infrastructure can verify the relationship between the owner of a certificate and the certificate, as well as generate, sign and/or administer the validity of certificates.

While the term HTTPS is employed herein, and HTTPS typically includes layering of HTTP over SSL and/or TLS encryption protocols, the embodiments described herein need not be limited to those employing HTTPS, SSL and/or TLS. For example, embodiments described herein can apply for any number of different environments that process content over the Internet that is received and/or transmitted via encrypted stream. As such, embodiments described herein can provide security enforcement for shared content such that content is provided for playback at devices only if the device provides an environment in which content is encrypted prior to transmission over the Internet. Accordingly, embodiments described herein envisage protocols that provide encryption of Internet traffic prior to transmission and decryption of the encrypted version of the Internet traffic upon receipt at the intended destination, whether the encryption and decryption is employed by SSL/TLS or otherwise.

In one scenario, for example, an interface component can facilitate a display of information indicative of an option to select a defined level of security for a first subset of content of a plurality of content, wherein the defined level of security is indicative of a first type of secure environment, the first type of secure environment being a hypertext transfer secure environment. A security component can associate the first subset of content of the plurality of content with an indicator indicative of the defined level of security. The security component can also determine that a device has the first type of secure environment, determine that the first subset of content is viewable at the device based on the determination that the device has the first type of secure environment, and generate decision information to facilitate output, to the device, of the first subset of content associated with the defined level of security, based on the determining that the first subset of content is viewable at the system.

In another scenario, a method includes determining, by a device including a processor, that a first subset of content of a plurality of content is viewable at a system based on a determination that the system provides a first type of secure environment, wherein the first subset of content is associated with information identifying the first type of secure environment. The method also includes generating decision information to facilitate output, to the system, of the first subset of content based on a determination of whether the system provides a first type of secure environment.

In another scenario, another method includes receiving, by a device including a processor, information indicative of selection of an option associated with a defined controlled access parameter applicable to a subset of content of a plurality of content. The method also includes determining an association between the subset of content and the defined controlled access parameter. Output of the subset of content can be restricted to devices identified by (or having associated entities/users identified by) the defined controlled access parameter.

In another scenario, another method is provided. The method includes: determining, by a device including a processor, that content for playback at the device is associated with a defined level of security; determining whether the device provides a first type of secure environment associated with the defined level of security; and requesting receipt of the content for playback based on a determination that the device provides the first type of secure environment. Accordingly, in this scenario, a user device determines whether to request content for playback at the user device based on whether the device provides the first type of secure environment and the specified defined level of security for the content.

In various scenarios, the security specification (e.g., HTTPS) and the privacy specification (e.g., full-time employees of Company X) are evaluated and content is provided to devices that meet (or have associated entities that meet) the security and privacy specifications.

One or more embodiments described herein can advantageously provide content creators and/or content owners increased ability to maintain the privacy and security of content by restricting devices authorized to receive particular content based on the security and/or privacy characteristics of the devices.

Turning now to the drawings, FIG. 1 is an illustration of a non-limiting block diagram of a system that facilitates security enforcement for shared content in accordance with one or more embodiments described herein. System 100 can facilitate restriction of content to playback at specified environments (e.g., HTTPS or environments encrypting Internet traffic prior to transmission over the Internet) and/or to specified entities (e.g., employees of Google, Inc.) to enhance privacy and/or security of content.

As shown in FIG. 1, system 100 can include user devices 102, 112, web server 104, secure content system 106 and/or content repository 107 and/or network 108. In various embodiments, one or more of user devices 102, 112, web server 104, secure content system 106 and/or content repository 107 can be communicatively coupled to one another via network 108 to perform one or more functions of system 100. In some embodiments, user devices 102, 112, web server 104, secure content system 106 and/or content repository 107 are electrically coupled to one another. Further, in some embodiments, web server 104 can include secure content system 106 and/or content repository 107 while in other embodiments, web server 104, secure content system 106 and/or content repository 107 can be separate entities that are communicatively coupled to one another via network 108.

User device 102 can include hardware and/or software configured to enable uploading, reception, transmission and/or processing of content (e.g., content 116, 118, 120) to and/or from user device 102. In various embodiments, content 116, 118, 120 can be any number of different types of content that can be encrypted including, but not limited to, audio, images, video, text, social media content (e.g., social media feed items), advertising content or the like. By way of example, but not limitation, content 116, 118, 120 can be or include legal, financial, and/or computer code documents and/or corporate presentations. In some embodiments, content 116, 118, 120 can be cloud-based and shared over network 108.

In the embodiment shown, user device 102 uploads content 116, 118, 120 to content repository 107 via network 108. In other embodiments, user device 102 accesses content 116, 118, 120 from a location remote from user device 102. For example, user device 102 can access content previously stored at content repository 107 and/or accessible by web server 104.

In either embodiment, user device 102 can include hardware and/or software to specify one or more security or privacy settings for content 116, 118, 120. Security settings can relate to whether playback on a device is restricted to those devices providing an HTTPS environment, whether playback on a device is restricted to those devices performing a security protocol that includes encryption of content prior to transmission over the Internet to the intended destination or whether playback is permitted/authorized on any device irrespective of whether the device provides an HTTPS environment or other security. In some embodiments, absence of a security specification can mean that content is not restricted for playback based on security. Privacy settings can relate to whether playback on a device is restricted to those devices having (or associated with entities having) specified characteristics or identities, for example.

User device 102 can specify a combination of security and privacy settings in some embodiments. By way of example, but not limitation, user device 102 can specify that content 116, 118, 120 should be restricted to playback on devices providing a designated level of security, having an association with a particular entity (e.g., user, corporate intranet) and/or having an association with an entity having one or more designated characteristics (e.g., Google, Inc. employee).

Figure 3:
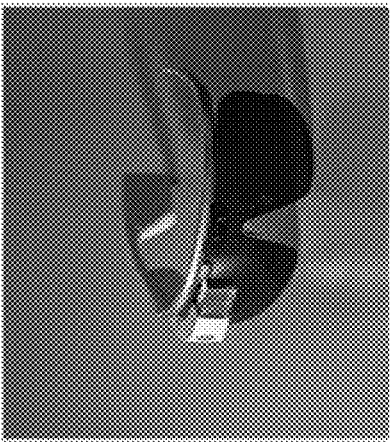
Figure 4:
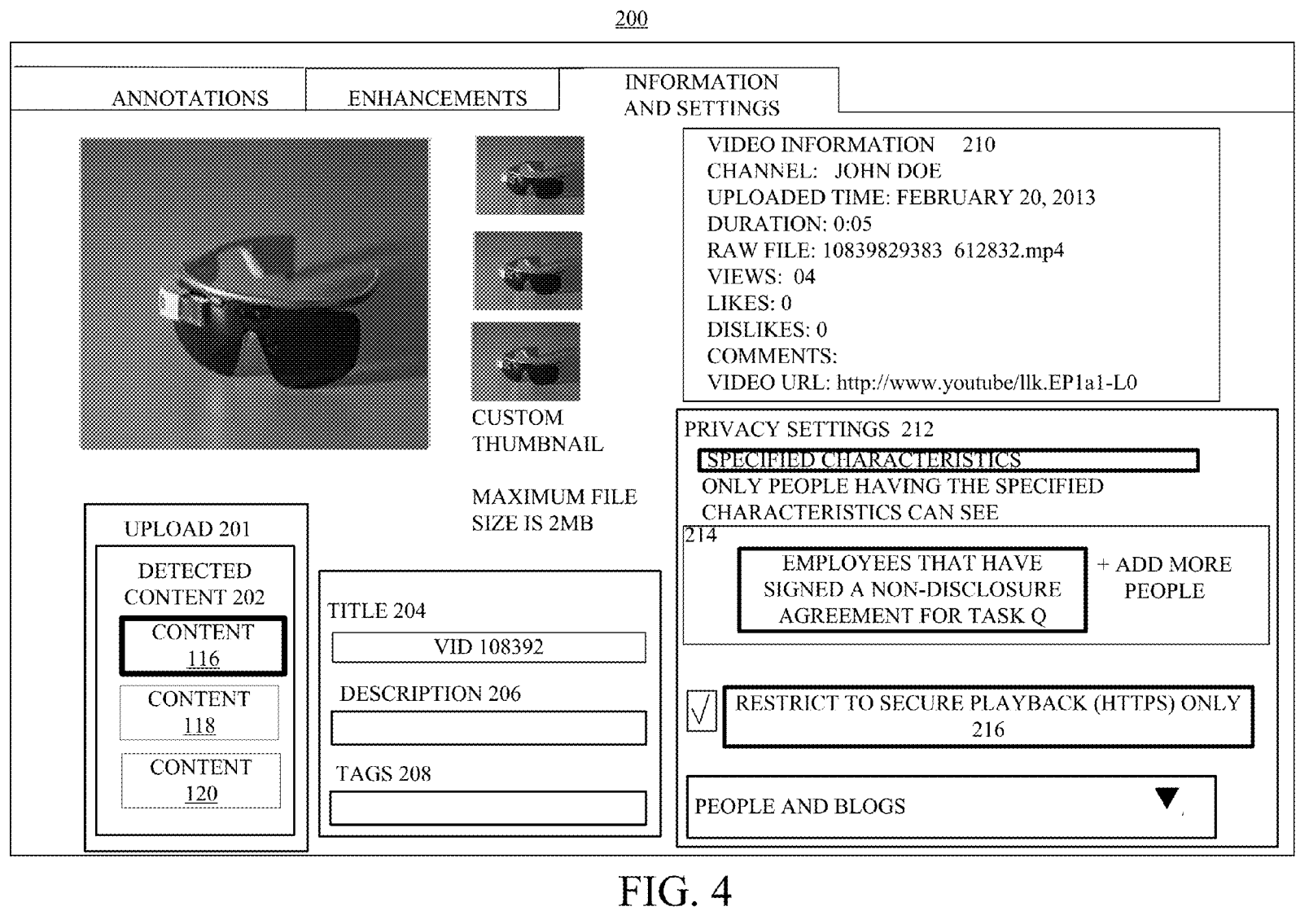

In some embodiments, user device 102 can specify privacy and/or security levels for playback of content 116, 118, 120 via interface component 110. Interface component 110 will be described in greater detail with reference to FIGS. 2, 3 and 4. FIGS. 2, 3 and 4 are illustrations of non-limiting user interfaces that facilitate security enforcement for shared content in accordance with one or more embodiments described herein. Repetitive description of like elements employed in other embodiments described herein is omitted for sake of brevity.

User interface (UI) 200 can be generated by interface component 110 of FIG. 1. In various embodiments, one or more portions of UI 200 can include a touch screen, one or more text boxes configured to receive input, one or more pull-down menus or buttons that can be toggled for selection of content and corresponding specification of privacy and/or security settings for the content. Any number of different approaches, arrangements or functionality can be employed via UI 200 to facilitate selection of content and specification of privacy and security. FIGS. 2, 3 and 4 show three example embodiments.

As shown in FIGS. 2, 3 and 4, UI 200 can include a first display region 201 that illustrates content 116, 118, 120 that can be selected for privacy and/or security specification. One or more of content 116, 118, 120 can be selected by activation of a portion of UI 200 associated with content 116, 118, 120. In the embodiment shown, content 116 is selected for privacy and/or security specification.

UI 200 can also provide a second display region 204 that provides a text box for entering a title for the selected content, a third display region 206 that provides a text box for entering a description for the selected content and/or a fourth display region 208 that provides a text box for entering one or more tags describing a characteristic of the selected content.

UI 200 can display information about the selected content at fifth display region 210. For example, as shown, fifth display region 210 can display information including, but not limited to, a channel associated with the selected content, the uploaded time and/or duration of the selected content, the raw file that embodies the selected content, the number of views, likes, dislikes, comments for the selected content and/or a URL associated with the selected content.

UI 200 can also provide a sixth display region 212 that can provide a text box or a set of options that can be selected for indicating that content 116 will be indicated as private content, while seventh display region 214 can provide a text box, or a set of options from which a selection can be made, to indicate the type of privacy setting desired. In various embodiments, one or more different characteristics of a device or entity associated with a device can be specified to indicate the type of privacy setting desired. Although not necessary, in some cases, an access control list (ACL) can be generated to indicate the type of privacy setting.

As shown in FIG. 2, content 116 can be specified as private such that only specified entities can playback content 116. In FIG. 2, the specified entities are those devices associated with Google, Inc. As such, only devices associated with Google, Inc. (and/or having entities e.g., users associated with Google, Inc.) can playback content 116. As such, business content owners can restrict dissemination of sensitive information to devices associated with the business if desired.

As another example, with reference to FIGS. 3 and 4, content 116 can be specified as being limited to playback on devices associated with entities having specified characteristics. For example, in the embodiment shown in FIG. 2, content 116 can be specified as private content that can only be viewed by devices associated with the Google.com domain name. Any number of different domains names can be indicated and, as such, can allow a content provider to limit devices on which sensitive content can be played. In some embodiments, UI 200 can allow specification that playback of content 116 be limited to devices proxying through a designated domain name.

In FIG. 3, content 116 is specified as limited to playback on devices associated with entities that have a specified set of characteristics. An ACL can be specified identifying a list of specific entities, devices and/or characteristics of entities and/or devices that can access content 116. For example, playback for content 116 can be restricted to devices associated with entities that are full-time employees of Google, Inc., and over age 18. In FIG. 4, content 116 is specified as limited to playback on devices associated with entities that are employees that have signed a non-disclosure agreement for Task Q. With reference to FIGS. 1, 2, 3 and 4, any number of security or privacy characteristics for which device compliance can be determined (by communication with the device or resort to record, etc.) by secure content system 106 via network 108 can be specified.

As shown in FIGS. 2, 3 and 4, UI 200 can also provide an eighth display region 216 that can provide a text box or a set of options that can be selected for specifying a defined level of security required for playback of content. For example, as shown, content 116 can be restricted to playback on devices providing HTTPS environments when the option is selected. In embodiments in which the restriction to HTTPS option in the eighth display region 216 is unselected, content 116 need not be restricted to devices providing HTTPS environments and, by contrast, can be provided for playback on devices that do not provide HTTPS environments. Although not shown, in some embodiments, UI 200 can include another display region that can receive information indicating other types of secure environments (other than HTTPS) to which content 116 is restricted.

In some embodiments, a ninth display region 218 can be provided to output visual information indicative of selected content 116. In other embodiments, UI 200 does not include ninth display region 218 yet can facilitate specification of privacy and security settings for content 116 via selection and specification of settings for the content.

In some embodiments, content 116 can be automatically associated with default settings during or after creation of content 116 without resort to specification via user device 102. For example, default privacy and/or security settings can be automatically determined (or, in some embodiments, recommended) for content 116 based on the owner of content 116 or an organization in which content 116 is created. For example, content created by a full-time employee of Company X can have a default security specification restricting the content to devices providing HTTPS environments.

Turning back to FIG. 1, content and/or privacy and/or security settings for content can be stored in content repository 107 in some embodiments. In other embodiments, privacy and/or security settings for content can be stored at or accessible by secure content system 106 and/or web server 104. Secure content system 106 can access the privacy and/or security settings for particular content for which a request has been received at web server 104 to determine whether web server 104 should output the requested content to the requesting device. In some embodiments, the requesting device is user device 112. As such, user device 112 can request content via the Internet for display via interface component 114, and secure content system 106 can generate information that can be received by web server 104 to allow web server 104 to determine whether to output the requested content to user device 112.

User device 112 can include hardware and/or software for requesting receipt of content and/or playback of content received over network 108 at user device 112. In various embodiments, interface component 114 can include software providing a web browser that can receive and output visual or audio content received via network 108 (e.g., Internet). In some embodiments, user device 112 provides HTTPS functionality via the web browser associated with interface component 114.

In other embodiments, user device 112 does not provide HTTPS functionality. For example, user device 112 can have a web browser that provides only HTTP communication and content to/from user device 112 is therefore unencrypted and subject to eavesdropping. Depending on the level of security provided by user device 112 and the privacy and/or security designations specified for content 116, 118, 120, access to one or more of content 116, 118, 120 may be restricted from user device 112 or served to user device 112.

In various embodiments, user device 102, 112 can include, but is not limited to, a cellular telephone, a tablet computer, a laptop computer, a personal digital assistant (PDA), a desktop computer or any device able to transmit and/or receive communication over network 108.

Web server 104 can include hardware, software or a combination of hardware and software configured to deliver content accessed via the Internet. As such, web server 104 can receive requests for content delivery from a web browser of a device, and can deliver the requested content to the requesting device. Content between web server 104 and user device 112 can be communicated via HTTP if user device 112 is not providing the HTTPS environment (e.g., if the request for content is provided via HTTP and not HTTPS) while content can be communicated over HTTPS if user device 112 is providing the HTTPS environment (e.g., if the request for content is provided via HTTPS).

In some embodiments, the content can be a file stored in content repository 107. As such, content repository 107 can be located in or accessible by web server 104 in some embodiments. By way of example, but not limitation, one or more flags having different values can be associated with content identifiers for the content. The values can indicate a security level or privacy type specification designated for the content associated with the content identifiers.

Figure 5:
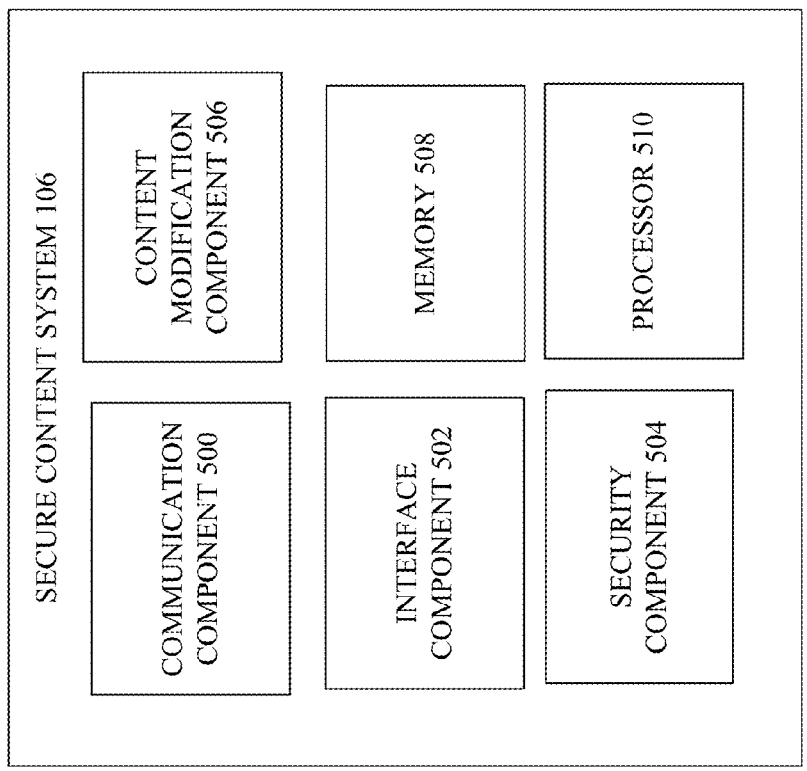
FIG. 5 is an illustration of a non-limiting block diagram of a secure content system that facilitates security enforcement for shared content in accordance with one or more embodiments described herein.

Secure content system 106 will be described in greater detail with reference to FIGS. 5 and 6. FIG. 5 is an illustration of a non-limiting block diagram of a secure content system that facilitates security enforcement for shared content in accordance with one or more embodiments described herein. Repetitive description of like elements employed in respective embodiments of systems and/or apparatus described herein are omitted for sake of brevity. FIG. 6 is an illustration of a non-limiting block diagram of a table that facilitates security enforcement for shared content in accordance with one or more embodiments described herein.

Turning first to FIG. 5, secure content system 106 can include communication component 500, interface component 502, security component 504, content modification component 506, memory 508 and/or processor 510. In various embodiments, one or more of communication component 500, interface component 502, security component 504, content modification component 506, memory 508 and/or processor 510 can be electrically and/or communicatively coupled to one another to perform one or more functions of secure content system 106.

Communication component 500 can transmit and/or receive information to/from web server 104, content repository 107 and/or user devices 102, 112. For example, communication component 500 can receive information indicative of a request for content to be provided over network 108 to user device 112. The information indicative of the request can be received from web server 104, for example, after web server 104 receives the request from a web browser associated with device 112.

As another example, communication component can receive information indicative of a type of security provided by device 112 (e.g., whether device 112 provides HTTPS and/or any other content encryption).

As another example, communication component 500 can receive or access information indicative of privacy and/or security settings for particular content and/or communication component 500 can transmit generated decision information as to whether content should be provided to user device 112 by web server 104. To generate the decision information, secure content component 106 can access the information indicative of privacy and/or security settings for particular content to determine one or more previously-specified association between particular content and particular privacy and security settings.

In some embodiments, the information indicative of privacy and/or security settings can be stored as shown in table 600 of FIG. 6. As shown, table 600 can include content identifiers 602, 604, 606, 608, 610, which can correspond to respective content. One or more of the content can have corresponding privacy and/or security settings.

In one embodiment, one or more flags having different values can be associated with the content identifiers to indicate the specific privacy or security setting for the content. In some embodiments, a flag can be toggled on or off to indicate that a particular privacy or security setting is enabled or disabled. For example, a flag can be toggled to turn on or off restriction on content sharing to devices providing HTTPS.

In the example shown in FIG. 6, content identifiers 602, 606, 608 have security settings restricting content associate with content identifiers 602, 606, 608 to playback on devices providing HTTPS environments. Content identifiers 604, 610 have no security settings specified and, as such, are not restricted to playback on devices providing HTTPS environments.

Further, as also shown in FIG. 6, content identifier 602 has an additional privacy specification beyond the HTTPS security level specification. In particular, content identifier 602 represents content for which playback is restricted to devices associated with entities that have signed a non-disclosure agreement for Task Q. By contrast, content identifier 608 represents content for which playback is restricted to devices associated with entities that are full-time employees of Company X.

Turning back to FIG. 5, security component 504 can restrict access to specific content based on whether the device requesting the content provides an HTTPS environment. For example, security component 504 can determine that content is specified for playback in a first type of secure environment (e.g., HTTPS environment). For example, security component 504 can obtain such information from table 600 of FIG. 6.

In one embodiment, security component 504 can determine that a device requesting the content provides the HTTPS environment. For example, if the request from the device was received by web server 104 over HTTPS, web server 104 can transmit information to security component 504 indicating the HTTPS request. In some embodiments, security component 504 can determine that the request was received over HTTPS without receipt of information from web server 104. For example, in some embodiments, as shown in FIG. 1, security component 504 can be a separate entity from web server 104. In some of these embodiments, security component 504 can be an intermediary between web server 104 and user device 112 and can therefore receive the request for content.

If the request was sent unencrypted or otherwise without use of HTTPS, security component 504 can recognize that the device is not providing an HTTPS environment.

In some embodiments, security component 504 can determine whether user device 112 provides the HTTPS environment based on information from user device 112 accompanying the request and advising security component 504 that user device 112 provides the HTTPS environment. In any embodiment, security component 504 can determine whether user device 112 is providing an HTTPS environment.

Security component 504 can compare the information identifying privacy and/or security settings for the requested content with the characteristics of user device 112. Security component 504 can control output of the content to the device (or generate information authorizing output of the content from web server 104 to the device) if there is a match between the privacy and security settings and the environment/characteristics of the requesting device. For example, if content requires an HTTPS environment, and the requesting device provides an HTTPS environment, security component 504 can determine that a match exists between the security setting for the content and the requesting device. If the privacy settings also match (e.g., if the content is limited to devices having entities associated with the Google, Inc. and the device is associated with an employee of Google, Inc.), security component 504 can determine that a match exists between the privacy setting for the content and the requesting device.

In some embodiments, security component 504 can control output of the content to the device (or generate information authorizing output of the content from web server 104 to the device) if the environment/characteristics of the requesting device meets or exceeds the privacy and security settings of the content. For example, if there are no security settings for content, yet the requesting device provides HTTPS, security component 504 can output the content (or generate authorization for the content to be output) to the device providing HTTPS since HTTPS is a higher level of security than that required.

Security component 504 can generate and output authorization (e.g., decision information) to web server 104. Web server 104 can transmit the content to the requesting device based on receipt of the authorization/decision information.

In another embodiment, security component 504 can determine that a device requesting the content does not provide the HTTPS environment. Security component 504 can output to the requesting device (or cause web server 104 to output to the requesting device) a message indicative of an inability to output the content based on the determination that the device does not provide the HTTPS environment.

Content modification component 506 of secure content system 106 can remove or augment content based on the determination made by security component 504. For example, in some embodiments, a plurality of content can be requested by a user device. If security component 504 determines that one or more of the plurality of content is not authorized to be provided to the requesting device, content modification component 506 can remove the content that is not authorized for playback at the requesting device. Web server 104 can then provide the remaining, authorized content to the requesting device.

In some embodiments, content modification component 506 can generate information to be transmitted with the authorized content to inform a user of the requesting device that selected content is unavailable and/or to inform the user of the requesting device of security and/or privacy requirements for receipt of the content that is not authorized for playback at the requesting device.

For example, in some embodiments, security component 504 can determine that a device requesting particular content does not provide the HTTPS environment while the content is restricted to playback only in HTTPS environments. Content modification component 506 can remove the content that is not authorized for dissemination to the requesting device. The remaining content that does not require the HTTPS environment can be output to the requesting device.

In another embodiment, security component 504 can determine that a device requesting particular content does not provide the HTTPS environment. Content modification component 506 of secure content system 106 can remove the content that is not authorized for dissemination to the requesting device and augment the remaining content with other content that does not require the HTTPS environment. For example, a message indicating that particular content is not available or is restricted to HTTPS environments only can be included as part of the content output to the requesting device. The resulting set of content can be output to the requesting device.

In another embodiment, security component 504 can determine that a device requesting particular content does not provide the HTTPS environment. Content modification component 506 of secure content system 106 can remove the content that is not authorized for dissemination to the requesting device and augment the remaining content with other content that does not require the HTTPS environment. For example, information directing the user of the requesting device to a secure website that provides an HTTPS environment can be output to the requesting device.

In various embodiments, security component 504 can determine that content is restricted to being shared only within a defined domain and/or according to one or more aspects specified by a defined access control list (ACL), in addition to being restricted to HTTPS environments. Accordingly, in some embodiments, one or more of the requirement for HTTPS (or other security providing encryption prior to transmission over the Internet) and/or various different types of privacy specifications can be evaluated by security component 504.

In some embodiments, security component 504 can restrict access to content based on the ACL specified for the content. For example, in one embodiment, security component 504 can restrict access to an ACL representing a specific set of users (e.g., users having specified identities, users logged into a particular system). In another embodiment, security component 504 can restrict access to an ACL having one or more characteristics of a group of users (e.g., full-time employees, or users under the age of 18).

In another embodiment, security component 504 can restrict content to devices (or devices associated with entities) that are part of a defined corporate network or that have proxied through a defined corporate network. Accordingly, content dissemination can be restricted to devices or entities associated with a defined corporation/business entity. This embodiment can be employed for systems that service content both inside and outside of a corporate intranet and/or for enterprise applications for use by large companies that have their own security protocols. With this embodiment, the company can enable entities to take advantage of a product generally and protect particular content with the security layer or logging into the own corporate network.

In another embodiment, security component 504 can restrict content to a specific domain. As such, content can be disseminated only within the specified domain.

In another embodiment, in the case of a social network or a group of events, security component 504 can remove from a rendered list of content intended for a device, events that contain content/elements specified to be provided only to environments providing HTTPS if the device does not provide an HTTPS environment.

In another embodiment, security component 504 can replace the events that contain the content/elements specified for HTTPS environments with other events and/or output text indicating that the events/content has a particular set of restrictions. For example, if a device requests navigates to a webpage with content designated as requiring an HTTPS environment for playback, information can be displayed to re-direct the device to an HTTPS version of the webpage. In another embodiment, security component 504 can output a message explaining why the content is not displayed to the device.

Various embodiments described herein can apply to streamed content as well as content such as feed items. For example, in some cases, streams of feed items typically contain a source and a media item. A requesting device can receive feed items from entities to which the device is subscribed. In some embodiments, feed items can be fetched through an application programming interface (API) that indicates whether the requesting device is making the request for the feed item via an HTTPS connection or a non-HTTPS connection.

In one embodiment, security component 504 can remove various feed items from the list of feed items to be delivered to the requesting device if the requesting device does not provide an HTTPS connection and the feed item is specified as being restricted to devices providing HTTPS.

Metadata can be employed to store information about the privacy and/or security specifications of a feed item. For example, one type of metadata associated with a feed item can indicate whether the feed item is to be restricted to playback in HTTPS environments only. If a feed item requires HTTPS and the requesting device does not provide HTTPS, content modification component 506 can delete the feed item restricted to HTTPS environments from the set of feed items intended for the requesting device. In this embodiment, the stream of feed items is uninterrupted even though some feed items have been removed.

In the embodiments described, web server 104 and/or secure content system 106 can detect whether the connection with the requesting device is over HTTPS or not because the traffic being transmitted and received is already encrypted if the connection is over the HTTPS connection. If the connection is over the HTTPS, the content requiring HTTPS can be provided. Otherwise, the content can be restricted and not provided. In some embodiments, the service side can indicate a fail and not attempt to provide the content.

In some embodiments, the requesting device can perform additional steps to reduce the wait time to receiving notification as to whether content can be played on the requesting device. For example, information such as that shown in table 600 of FIG. 6 can be accessible to the requesting device. For example, table 600 can be in a location publicly accessible over the Internet.

When the player of the device communicates with the web browser of the device, the player can determine whether particular content has an HTTPS requirement. If the content has an HTTPS requirement, and the web browser does not provide HTTPS, a fail situation can occur immediately instead of the device requesting the content and the fail occurring after receipt of the request. The device can forego request of the content.

In some embodiments, interface component 502 of secure content system 106 can be provided. Interface component 502, for example, can generate and/or output information for generation of UI 200 described with reference to FIGS. 2, 3 and 4. In these embodiments, for example, the information for UI 200 can be transmitted to user device 102 for display via interface component 110.

In other embodiments, a user interface generated by interface component 502 can be accessed directed at secure content system 106 to configure security and/or privacy settings for selected content.

Memory 508 can be a computer-readable storage medium storing computer-executable instructions and/or information for performing the functions described herein with reference to secure content system 106 (or any component of secure content system 106). For example, memory 508 can store computer-executable instructions that can be executed by processor 510 to perform communication, evaluation, decision-making or other types of functions executed by security component 504 and/or content modification component 506. Processor 510 can perform one or more of the functions described herein with reference to secure content system 106. For example, processor 510 can determine whether content is authorized to be provided to a device for playback, determine one or more conditions specified by an ACL for content, remove content that is not authorized to be provided to a device for playback or the like.

Turning back to FIG. 1, network 108 can be or include a wired or wireless channel providing connectivity between two or more points. For example, network 108 can communicatively and/or electrically couple one or more of secure content system 106, web server 104, content repository 107 and/or user devices 102, 112. By way of example, but not limitation, network 108 can be a cellular network, a wide area network (WAN) (e.g., Internet), a local area network (LAN), or a personal area network (PAN). Network 108 can utilize any number of different types of wired or wireless technology, including, for example, cellular, WAN, wireless fidelity (Wi-Fi), Wi-Max and/or WLAN.

Although not shown, in some embodiments, secure content system 106, content repository 107 and/or web server 104 can be cloud-based systems.

Figure 7:
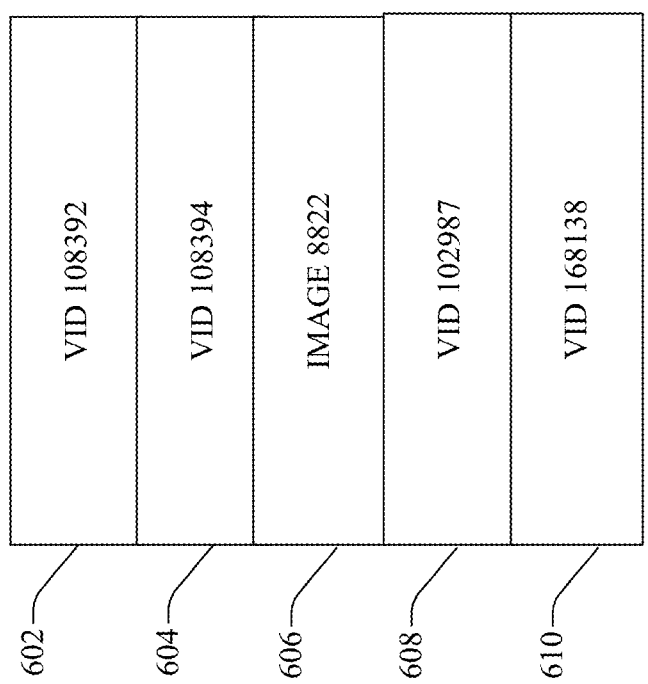
FIG. 7 is an illustration of a non-limiting block diagram of an unfiltered set of content to be provided to a device configured to provide an HTTPS environment in accordance with one or more embodiments described herein.

FIG. 7 is an illustration of a non-limiting block diagram of an unfiltered set of content to be provided to a device configured to provide an HTTPS environment in accordance with one or more embodiments described herein. Repetitive description of like elements employed in other embodiments described herein is omitted for sake of brevity.

Because the environment of the device requesting the content is an HTTPS environment, content specified as HTTPS only (e.g., content 602, 606, 608) and content not specified as HTTPS only (e.g., content 604, 610) can be provided to the requesting device for playback in response to request from the user device (if the requesting device also meets the privacy specifications of the content associated with content identifiers 602, 608). As such, content modification component 506 of FIG. 5 can aggregate a set of content inclusive of each portion of content requested by the requesting device.

With reference to FIG. 5, content that does not meet the security (e.g., HTTPS) requirements and privacy requirements can be removed by content modification component 506 of secure content system 106 prior to the content being provided to the requesting device.

Figure 8:
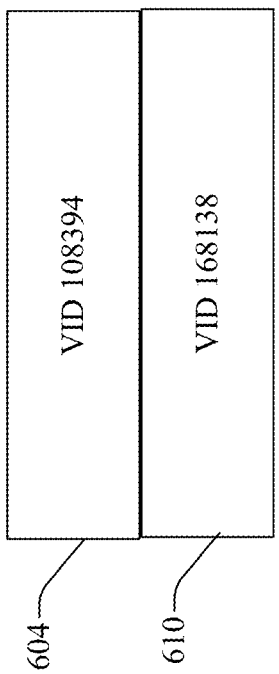
FIG. 8 is an illustration of a non-limiting block diagram of a filtered set of content to be provided to a device not configured to provide an HTTPS environment in accordance with one or more embodiments described herein.

FIG. 8 is an illustration of a non-limiting block diagram of a filtered set of content to be provided to a device not configured to provide an HTTPS environment in accordance with one or more embodiments described herein. Repetitive description of like elements employed in other embodiments described herein is omitted for sake of brevity.

For example, security component 504 can determine that the requesting device does not provide an HTTPS environment. Accordingly, if content associated with content identifiers 602, 604, 606, 608, 610 was requested by the device, content modification component 506 can remove content associated with content identifiers 602, 606, 608 prior to the content being sent to the requesting device.

Figure 9:
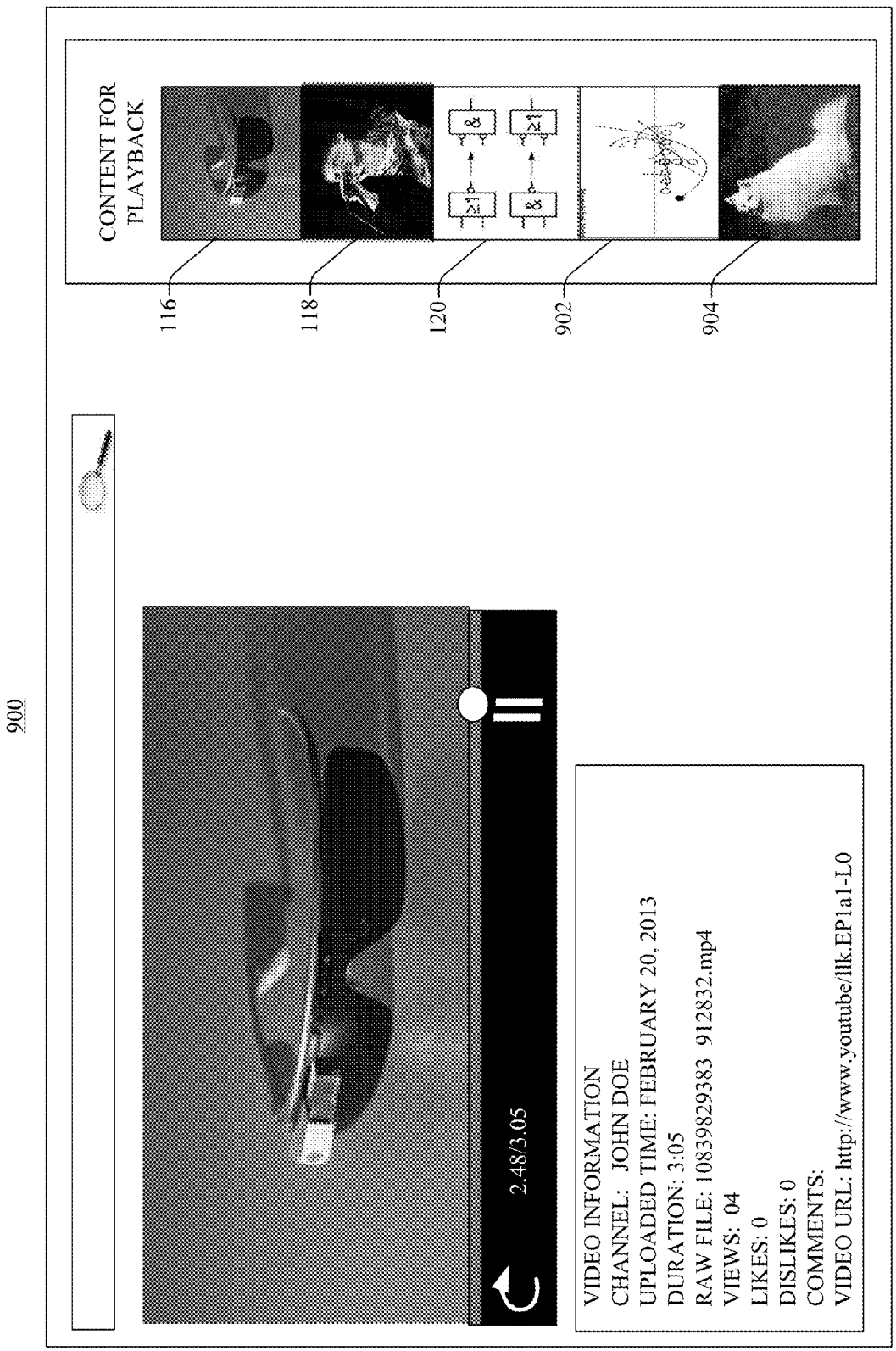
FIG. 9 is an illustration of a non-limiting user interface of a device that meets the security and privacy specifications of requested content and performing playback of the content in accordance with one or more embodiments described herein.

FIG. 9 is an illustration of a non-limiting user interface of a device that meets the security and privacy specifications of requested content and performing playback of the content in accordance with one or more embodiments described herein. Repetitive description of like elements employed in other embodiments described herein is omitted for sake of brevity.

Content 116, 118, 120, 902, 904 of FIG. 9 can correspond to content identifiers 602, 604, 606, 608, 610 of FIG. 6, for example. As shown in FIG. 9, each of content 116, 118, 120, 902, 904 is provided to the requesting device for playback. In this embodiment, since content 116, 120, 902 requires an HTTPS environment and the requesting device provides an HTTPS environment, each of content 116, 118, 120, 902, 904 can be served over HTTPS.

Figure 10:
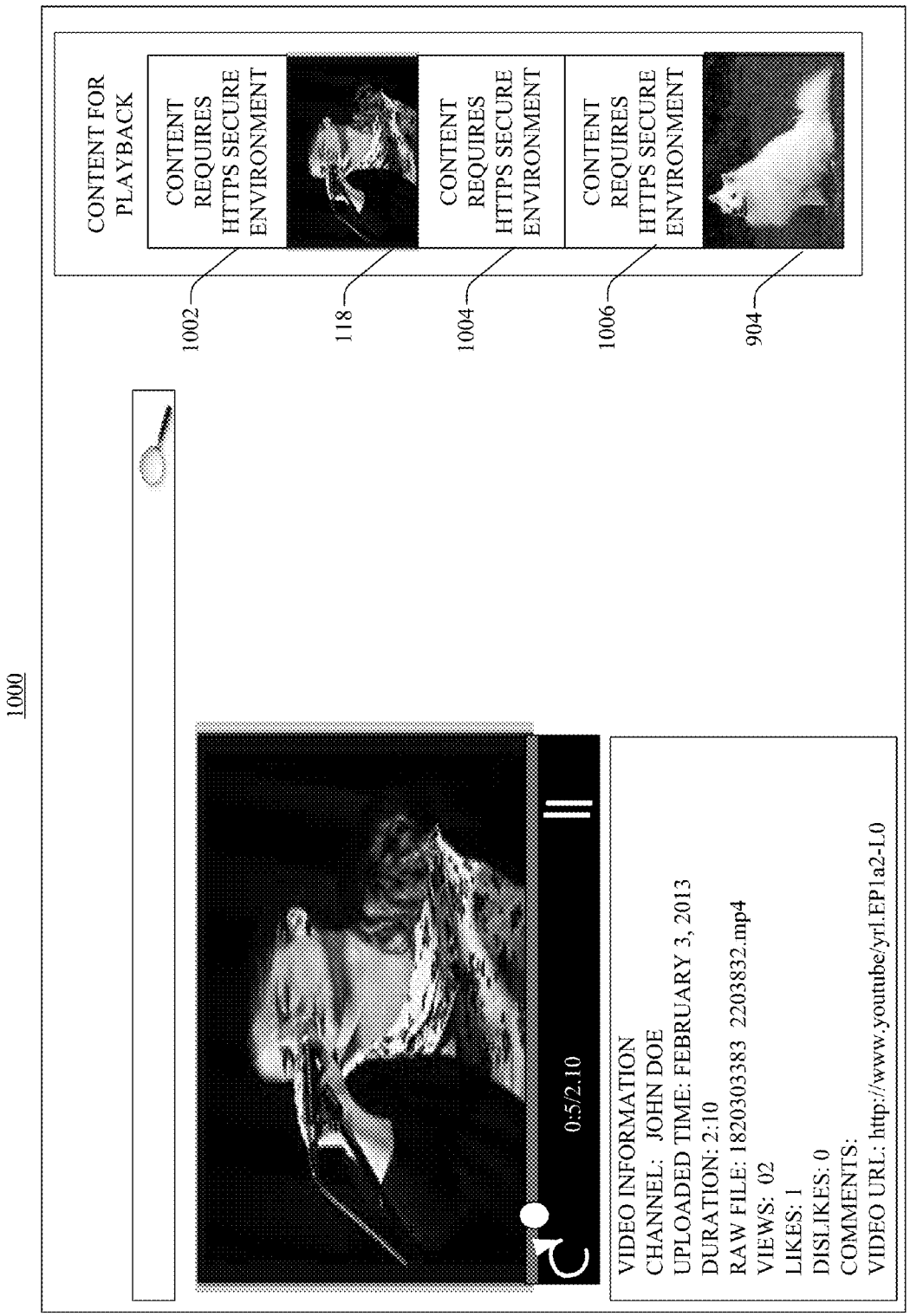
FIGS. 10 and 11 are illustrations of non-limiting user interfaces of a device that fails to meet the security specifications of requested content and performing playback of filtered content in accordance with one or more embodiments described herein.
Figure 11:
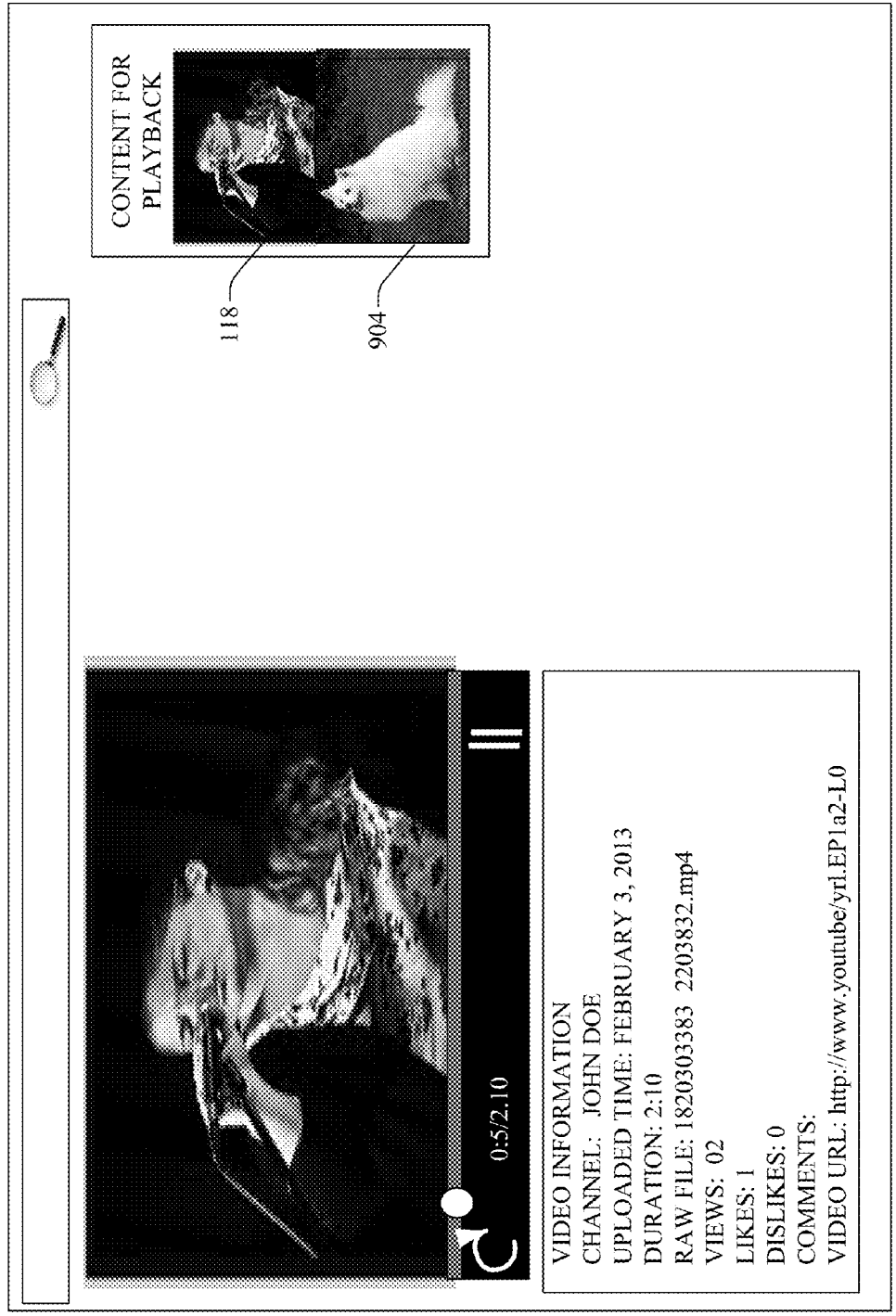

FIGS. 10 and 11 are illustrations of non-limiting user interfaces of a device that fails to meet the security specifications of requested content and performing playback of filtered content in accordance with one or more embodiments described herein. Repetitive description of like elements employed in other embodiments described herein is omitted for sake of brevity.

As shown, in FIG. 10, only content 118, 904, which are those that do not require HTTPS, are provided to the requesting device although requesting device may have requested content 116, 118, 120, 902, 904. In this embodiment, the entire set of content provided to the requesting device can be augment with one or more messages 1002, 1004, 1006 in lieu of content 116, 120, 902, which requires an HTTPS environment. Messages 1002, 1004, 1006 can output information that informs the viewer that the particular requested content cannot be displayed because the environment is not an HTTPS environment.

As shown, in FIG. 11, only content 118, 904, which are those that do not require HTTPS, are provided to the requesting device although requesting device may have requested content 116, 118, 120, 902, 904. In this embodiment, the content provided to the requesting device can be the content for which the device meets any security and/or privacy specifications notwithstanding more content may have been requested by the device.

Figure 12:
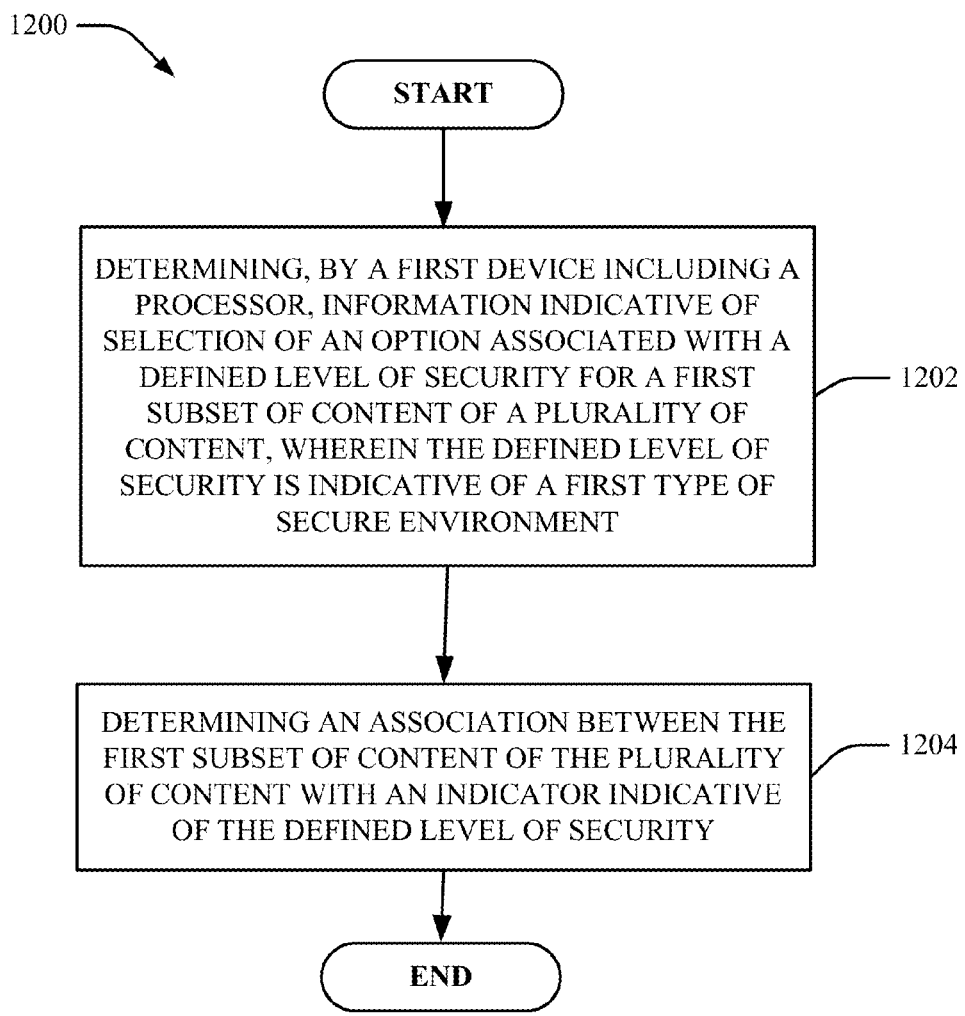
FIGS. 12, 13, 14, 15, 16, 17, 18 and 19 are illustrations of non-limiting flow diagrams of methods that facilitate security enforcement for shared content in accordance with one or more embodiments described herein.

FIGS. 12, 13, 14, 15, 16, 17, 18 and 19 are illustrations of non-limiting flow diagrams of methods that facilitate security enforcement for shared content in accordance with one or more embodiments described herein. Turning first to FIG. 12, at 1202, method 1200 can include determining, by a first device including a processor, information indicative of selection of an option associated with a defined level of security for a first subset of content of a plurality of content, wherein the defined level of security is indicative of a first type of secure environment (e.g., using security component 504). For example, with reference to FIG. 6, the information associating the content with the defined level of security for playback of the content can be stored at a table such as that shown at FIG. 6.

At 1204, method 1200 can include determining an association between the first subset of content of the plurality of content with an indicator indicative of the defined level of security (e.g., using security component 504). The defined level of security can be a level of security indicative of HTTPS in some embodiments and, in other embodiments, a level of security that provides encrypted content between the first device and the second device. The first type of secure environment can be the HTTPS environment.

Figure 13:
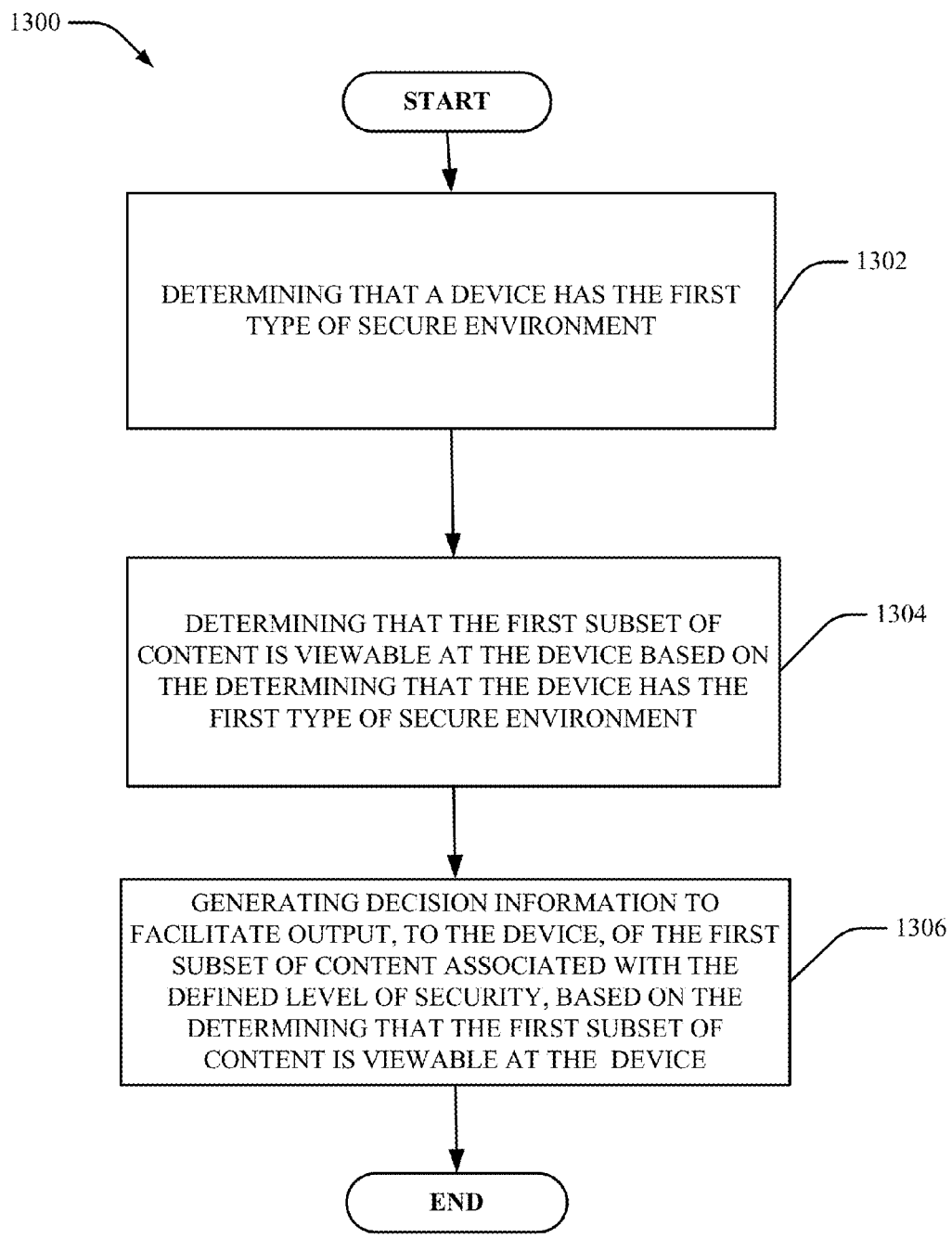

Tuning now to FIG. 13, at 1302, method 1300 can include determining that a device has the first type of secure environment (e.g., using security component 504). In some embodiments, determining that the device has the first type of secure environment is performed in response to receiving a request for the first subset of content from the device.

At 1304, method 1300 can include determining that the first subset of content is viewable at the device based on the determining that the device has the first type of secure environment (e.g., using security component 504). In various embodiments, the content can be any type of content that can be encrypted and provided via the Internet including, but not limited to, video, audio, images, text, social media feed items or the like.

At 1306, method 1300 can include generating decision information to facilitate output, to the device, of the first subset of content associated with the defined level of security, based on the determining that the first subset of content is viewable at the device (e.g., using security component 504). The first subset of content can be received at the device for playback within an environment having security and/or privacy defined by the level of security designated for the content. In some embodiments, the first subset of content can be output over HTTPS, and can be decrypted by the device upon receipt.

Figure 14:
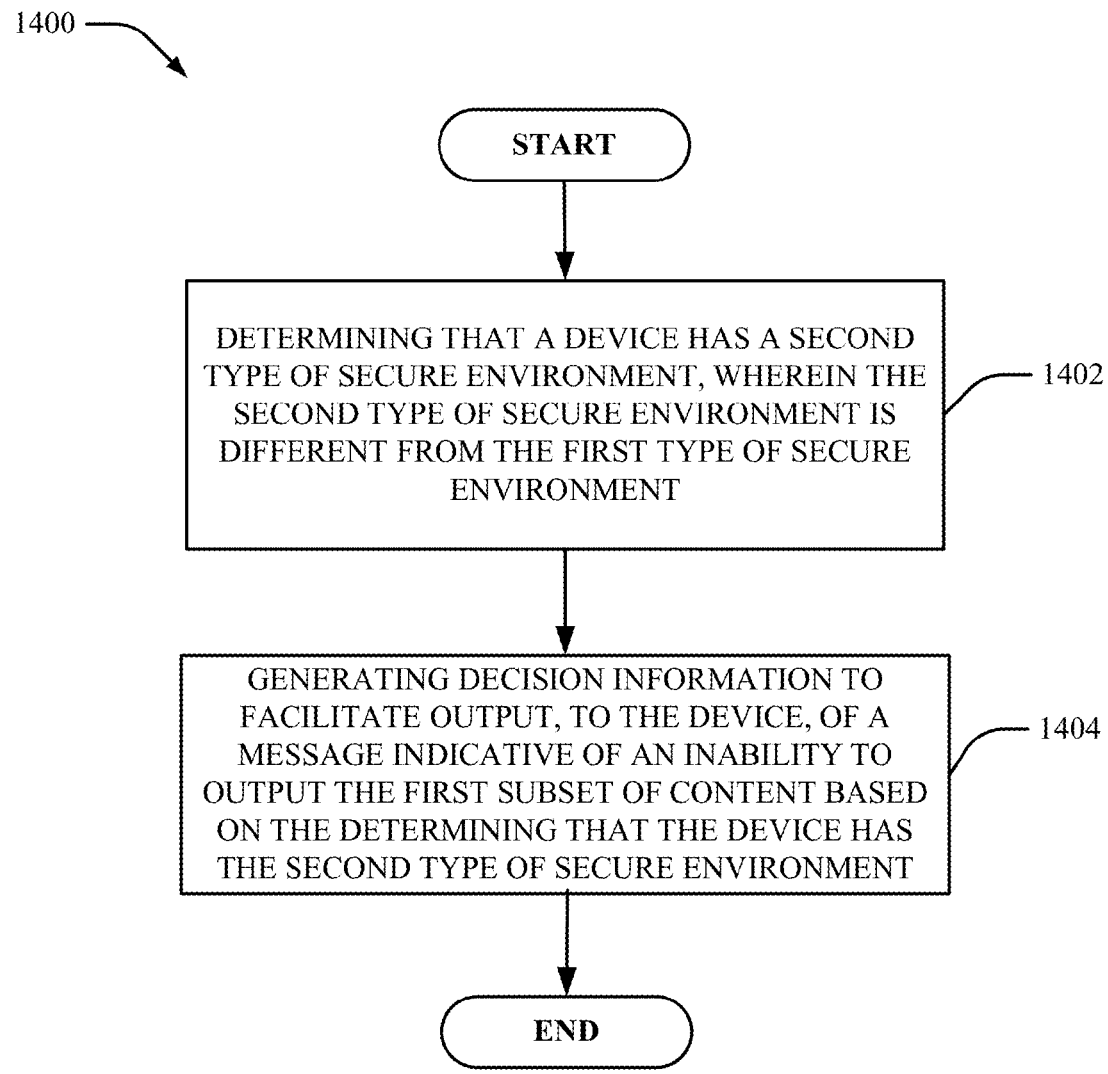

Turning now to FIG. 14, at 1402, method 1400 can include determining that a device has a second type of secure environment, wherein the second type of secure environment is different from the first type of secure environment (e.g., using security component 504). For example, the second type of secure environment can be an environment that either does not provide security or it does not provide the type of security indicated for the content as being required for playback. For example, if the content is designated for playback in environments that provide HTTPS, the second type of secure environment can be a non-HTTPS environment.

At 1404, method 1400 can include generating decision information to facilitate output, to the device, of a message indicative of an inability to output the first subset of content based on the determining that the system has the second type of secure environment (e.g., using security component 504). For example, in lieu of providing the first subset of content (if the first subset of content is designated for playback in a particular type of secure environment not provided by the device requesting the content), the device can receive a message informing the device that the particular type of security is required and/or must be activated for receipt of the requested content. The message can be output over HTTP (in lieu of being output over HTTPS).

Figure 15:
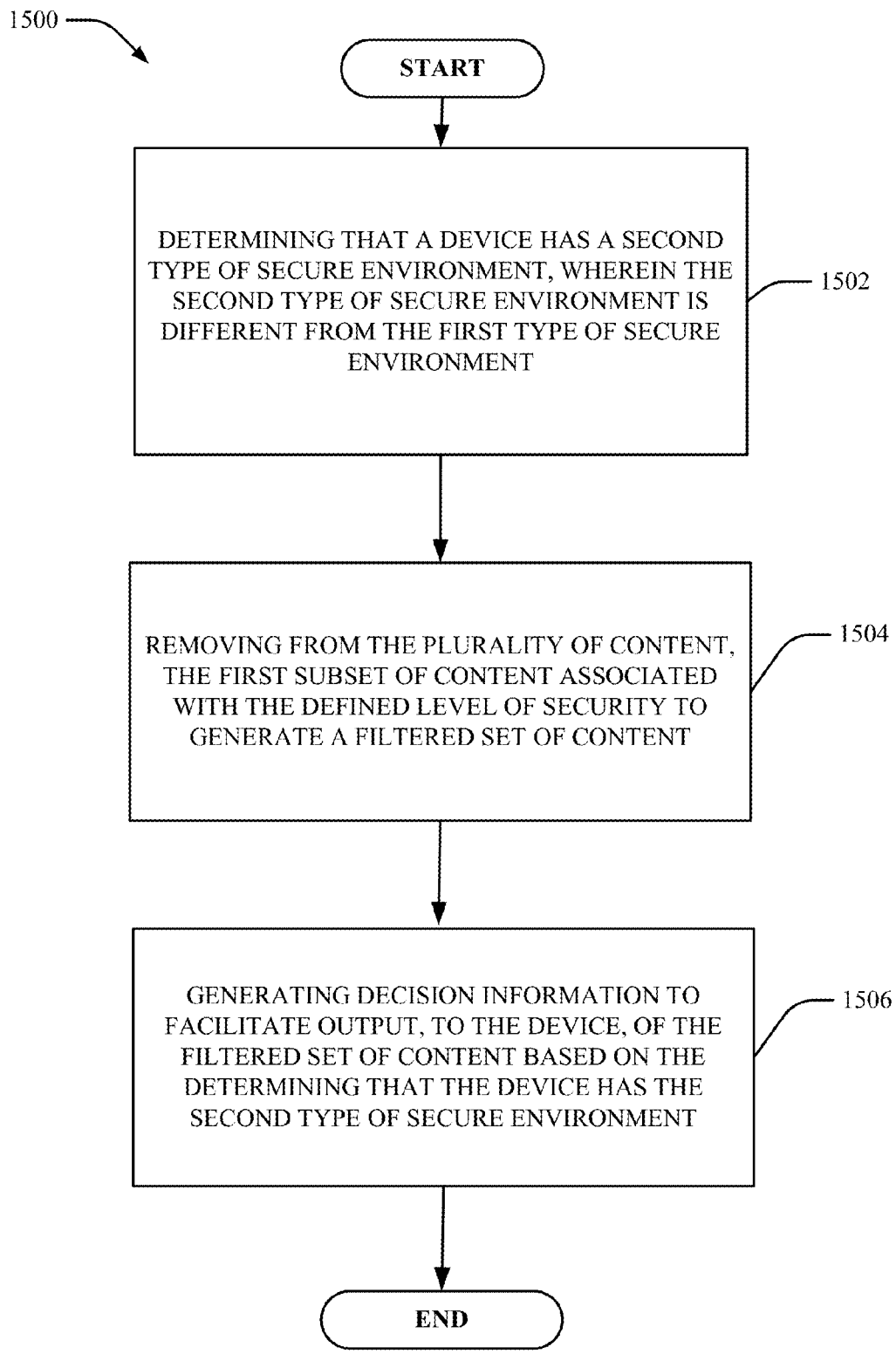

Turning now to FIG. 15, at 1502, method 1500 can include determining that a system has a second type of secure environment, wherein the second type of secure environment is different from the first type of secure environment (e.g., using security component 504). At 1504, method 1500 can include removing from the plurality of content, the first subset of content associated with the defined level of security to generate a filtered set of content (e.g., using content modification component 506). For example, if a device has requested content and some of the content is designated for a particular type of secure environment that is not provided by the device, the content modification component can filter out the content that is designated for the type of security not provided by the device. The device can then receive only the content that is not designated for the particular type of secure environment that is not provided by the device.

At 1506, method 1500 can include generating decision information to facilitate output, to the system, of the filtered set of content based on the determining that the device has the second type of secure environment (e.g., (e.g., using security component 504). The filtered set of content can be output over HTTP (in lieu of being output over HTTPS).

Figure 16:
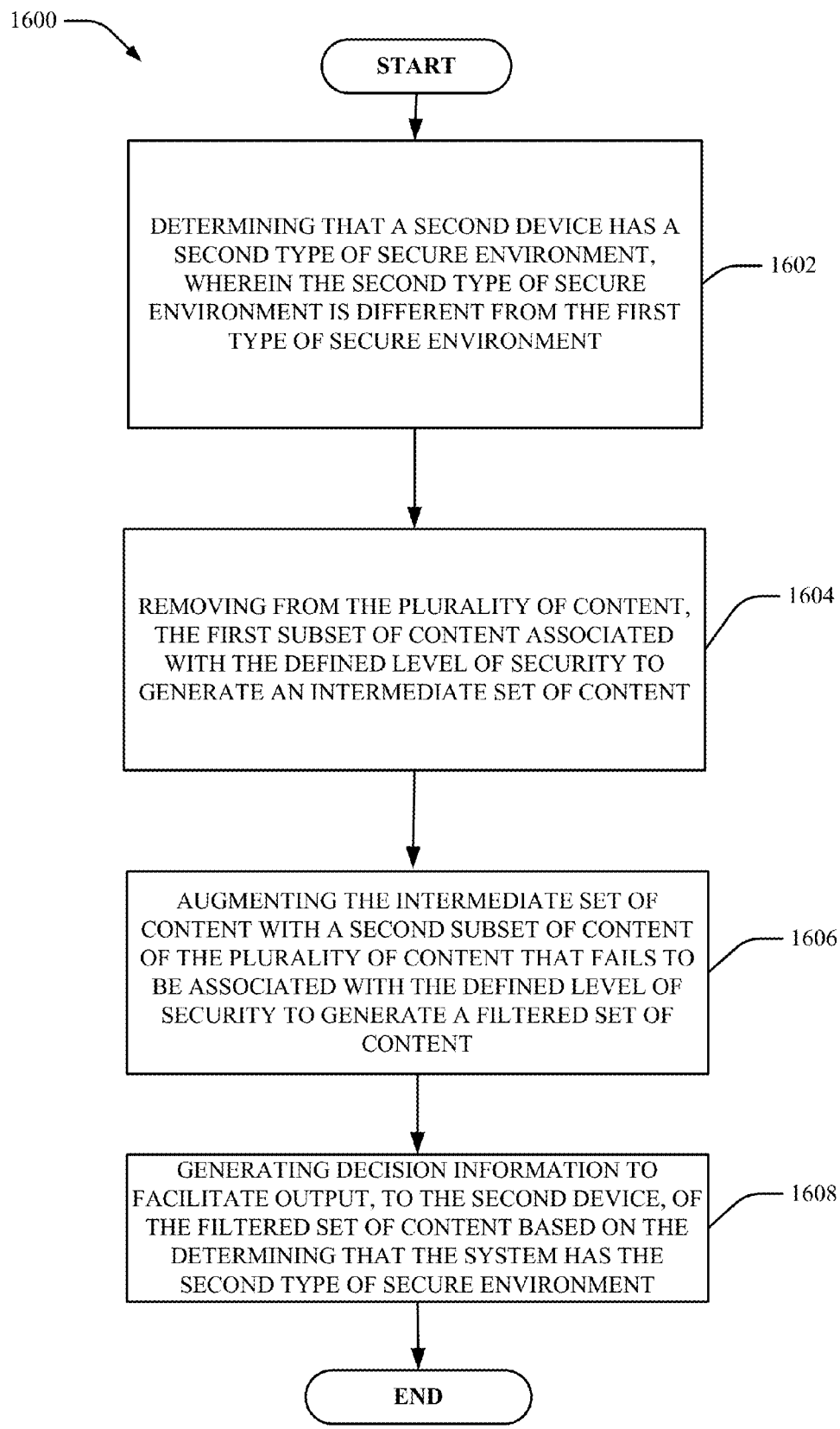

Turning now to FIG. 16, at 1602, method 1600 can include determining that a system has a second type of secure environment, wherein the second type of secure environment is different from the first type of secure environment (e.g., using security component 504). At 1604, method 1600 can include removing from the plurality of content, the first subset of content associated with the defined level of security to generate an intermediate set of content (e.g., using content modification component 506).

At 1606, method 1600 can include augmenting the intermediate set of content with a second subset of content of the plurality of content that fails to be associated with the defined level of security to generate a filtered set of content (e.g., using content modification component 506). In this embodiment, for example, in lieu of sending only the content that is authorized for playback at the device, the content modification component can also augment such content with descriptive information indicating that the content that is restricted has been removed (as shown in FIG. 10, for example).

At 1608, method 1600 can include generating decision information to facilitate output, to the system, of the filtered set of content based on the determining that the system has the second type of secure environment (e.g., using security component 504). The filtered set of content can be output over HTTP (in lieu of being output over HTTPS).

Figure 17:
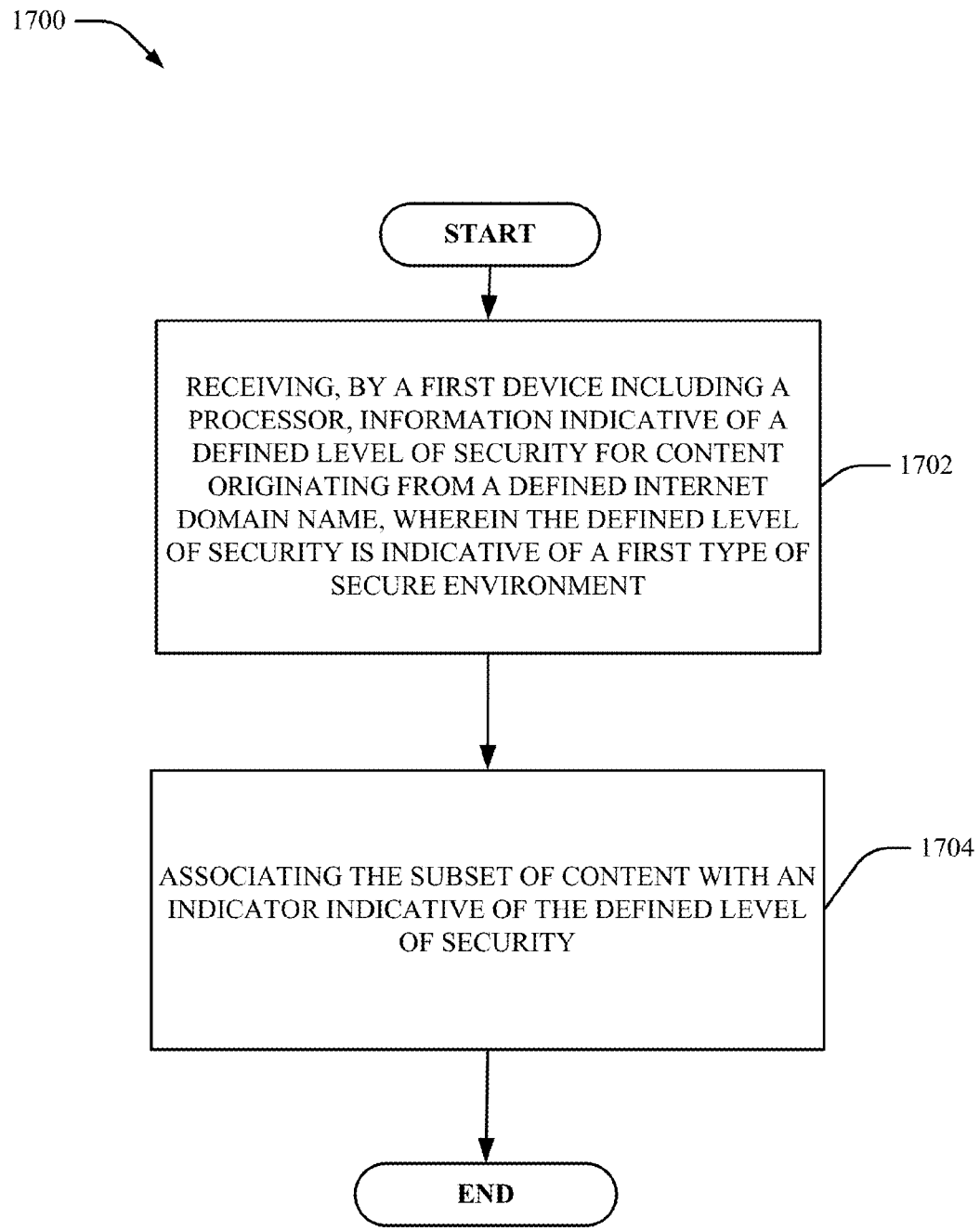

Turning now to FIG. 17, at 1702, method 1700 can include receiving, by a first device including a processor, information indicative of a defined level of security for content originating from a defined internet domain name, wherein the defined level of security is indicative of a first type of secure environment (e.g., using security component 504). At 1704, method 1700 can include associating the subset of content with an indicator indicative of the defined level of security (e.g., using security component 206). The first subset of content can be output over HTTPS in some embodiments, for example, and can be decrypted upon receipt.

Figure 18:
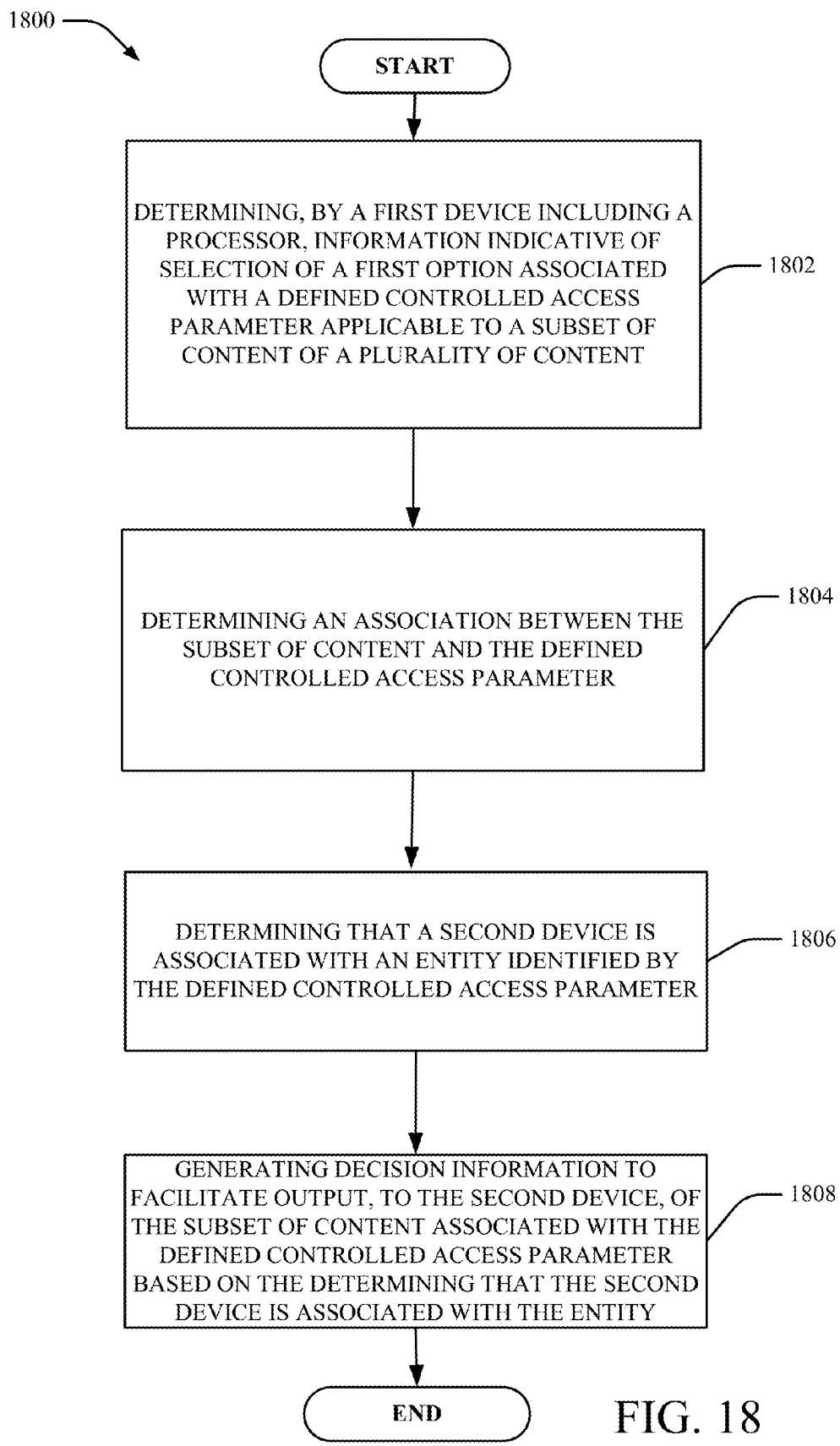

Turning now to FIG. 18, at 1802, method 1800 can include determining, by a first device including a processor, information indicative of selection of a first option associated with a defined controlled access parameter applicable to a subset of content of a plurality of content (e.g., using security component 504). At 1804, method 1800 can include determining that a second device is associated with an entity identified by the defined controlled access parameter (e.g., using security component 504).

At 1806, method 1800 can include determining that a second device is associated with an entity identified by the defined controlled access parameter (e.g., using security component 504).

At 1808, method 1800 can include generating decision information to facilitate output, to the second device, of the subset of content associated with the defined controlled access parameter based on the determining that the second device is associated with the entity (e.g., using security component 504). The content can be output over HTTPS in some embodiments, for example, and can be decrypted by the second device upon receipt.

Figure 19:
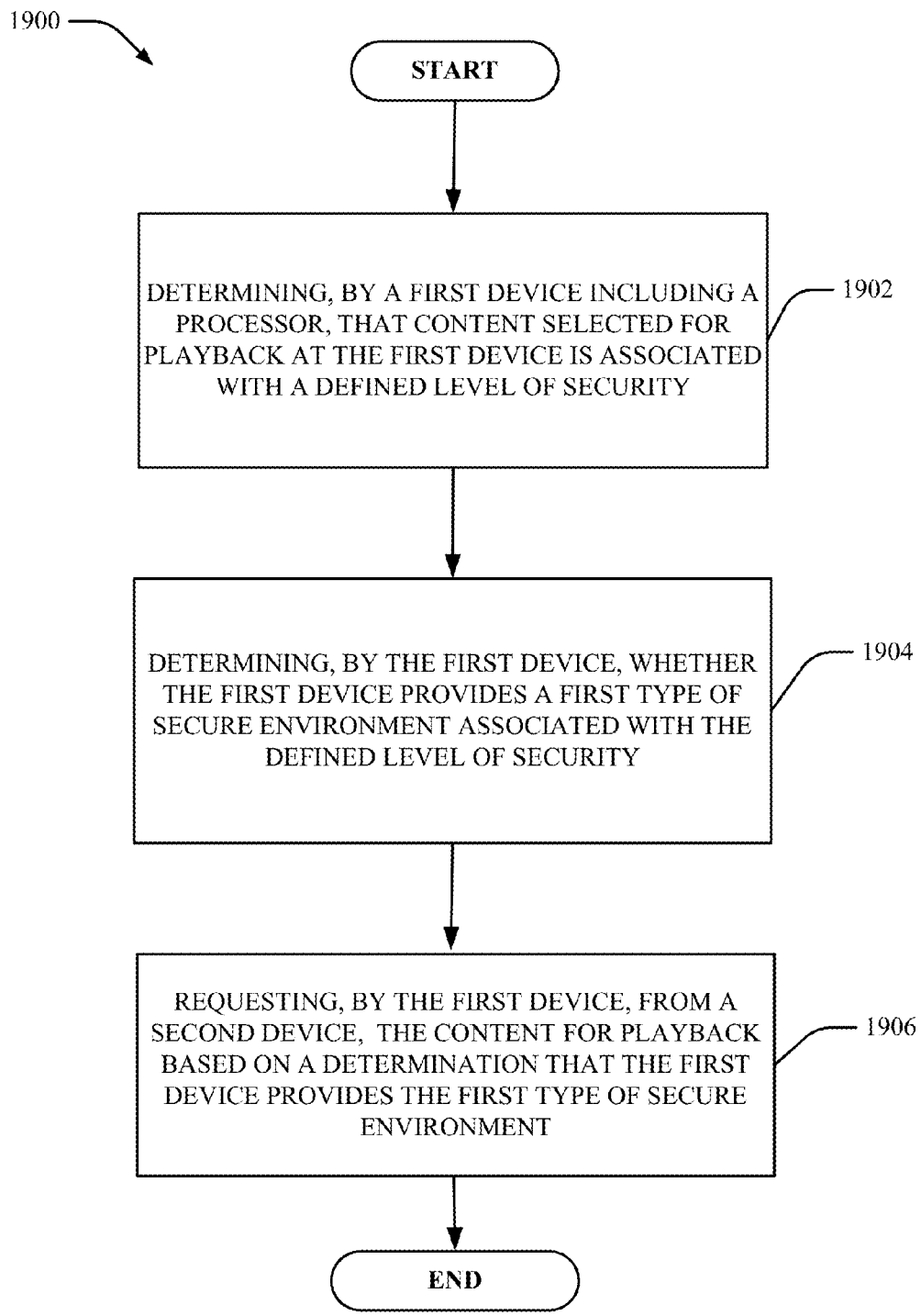

Turning now to FIG. 19, at 1902, method 1900 can include determining, by a first device including a processor, that content selected for playback at the first device is associated with a defined level of security (e.g., using user device 112). At 1904, method 1900 can include determining, by the first device, whether the first device provides a first type of secure environment associated with the defined level of security (e.g., using user device 112). At 1906, method 1900 can include requesting, by the first device, from a second device, the content for playback on the first device based on a determination that the first device provides the first type of secure environment (e.g., using user device 112).

Accordingly, in this embodiment, the device on which the content is to be played can evaluate the level of security specified for the content, evaluate whether the device provides the level of security specified and request the content only if the device has determined that the device provides the specified level of security. Accordingly, this embodiment can reduce content requesting traffic and also reduce the amount of wait time before the device receives information indicating that the content cannot be provided for playback at the device.

Example Operating Environments

Figure 20:
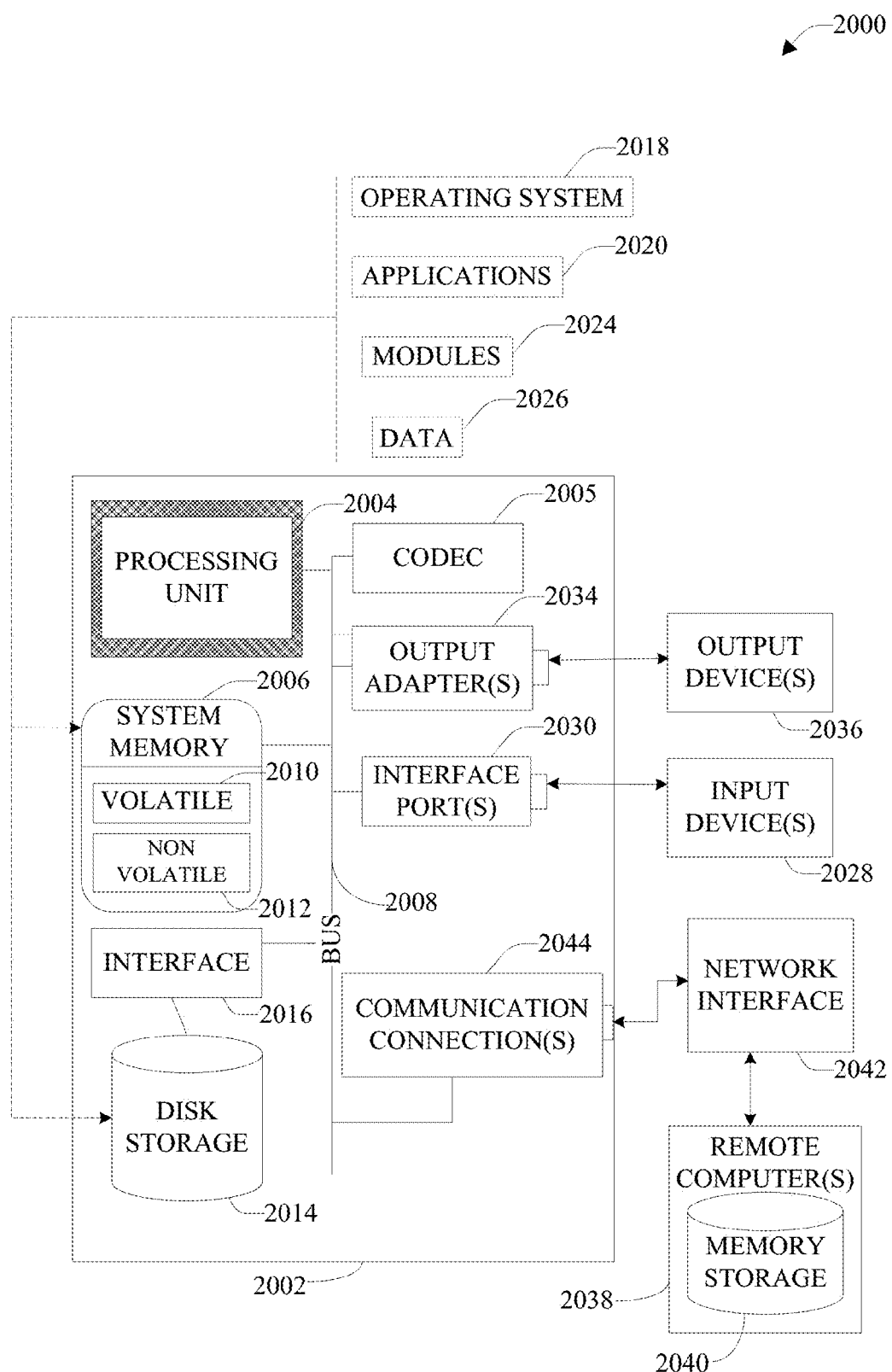
FIG. 20 is an illustration of a schematic diagram of a non-limiting operating environment for implementing one or more embodiments described in this disclosure.

FIG. 20 is an illustration of a schematic diagram of a non-limiting operating environment for implementing one or more embodiments described in this disclosure.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

With reference to FIG. 20, a suitable environment 2000 for implementing various embodiments described herein is or can include a computer 2002. The computer 2002 includes a processing unit 2004, a system memory 2006, a codec 2005, and a system bus 2008. The system bus 2008 couples system components including, but not limited to, the system memory 2006 to the processing unit 2004. The processing unit 2004 can be any of various available processors. Dual microprocessors and other multiprocessor architectures also can be employed as the processing unit 2004.

The system bus 2008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2006 includes volatile memory 2010 and non-volatile memory 2012. The basic input/output system (BIOS), containing the basic routines to transfer information between elements within the computer 2002, such as during start-up, is stored in non-volatile memory 2012. In addition, according to one or more embodiments, codec 2005 may include at least one of an encoder or decoder, wherein the at least one of an encoder or decoder may consist of hardware, a combination of hardware and software, or software. Although, codec 2005 is depicted as a separate component, codec 2005 may be contained within non-volatile memory 2012. By way of illustration, and not limitation, non-volatile memory 2012 can include read only memory (ROM), programmable ROM (PROM), electrically programmable ROM (EPROM), electrically erasable programmable ROM (EEPROM), or flash memory. Volatile memory 2010 includes random access memory (RAM), which acts as external cache memory. According to present aspects, the volatile memory may store the write operation retry logic (not shown in FIG. 20) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM.

Computer 2002 may also include removable/non-removable, volatile/non-volatile computer storage medium. FIG. 20 illustrates, for example, disk storage 2014. Disk storage 2014 includes, but is not limited to, devices like a magnetic disk drive, solid state disk (SSD) floppy disk drive, tape drive, Jaz drive, Zip drive, LS-70 drive, flash memory card, or memory stick. In addition, disk storage 2014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2014 to the system bus 2008, a removable or non-removable interface is typically used, such as interface 2016.

It is to be appreciated that FIG. 20 describes software that acts as an intermediary between users and the basic computer resources described in the suitable operating environment 2000. Such software includes an operating system 2018. Operating system 2018, which can be stored on disk storage 2014, acts to control and allocate resources of the computer 2002. Applications 2020 take advantage of the management of resources by operating system 2018 through program modules 2024, and program data 2026, such as the boot/shutdown transaction table and the like, stored either in system memory 2006 or on disk storage 2014. It is to be appreciated that the claimed subject matter can be implemented with various operating systems or combinations of operating systems.

A user enters commands or information into the computer 2002 through input device(s) 2028. Input devices 2028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2004 through the system bus 2008 via interface port(s) 2030. Interface port(s) 2030 include, for example, a serial port, a parallel port, a game port, and a universal serial bus (USB). Output device(s) 2036 use some of the same type of ports as input device(s). Thus, for example, a USB port may be used to provide input to computer 2002, and to output information from computer 2002 to an output device 2036. Output adapter 2034 is provided to illustrate that there are some output devices 2036 like monitors, speakers, and printers, among other output devices 2036, which require special adapters. The output adapters 2034 include, by way of illustration and not limitation, video and sound cards that provide a means of connection between the output device 2036 and the system bus 2008. It should be noted that other devices and/or systems of devices provide both input and output capabilities such as remote computer(s) 2038.

Computer 2002 can operate in a networked environment using logical connections to one or more remote computers, such as remote computer(s) 2038. The remote computer(s) 2038 can be a personal computer, a server, a router, a network PC, a workstation, a microprocessor based appliance, a peer device, a smart phone, a tablet, or other network node, and typically includes many of the elements described relative to computer 2002. For purposes of brevity, only a memory storage device 2040 is illustrated with remote computer(s) 2038. Remote computer(s) 2038 is logically connected to computer 2002 through a network interface 2042 and then connected via communication connection(s) 2044. Network interface 2042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2044 refers to the hardware/software employed to connect the network interface 2042 to the bus 2008. While communication connection 2044 is shown for illustrative clarity inside computer 2002, it can also be external to computer 2002. The hardware/software necessary for connection to the network interface 2042 includes, for exemplary purposes only, internal and external technologies such as, modems including regular telephone grade modems, cable modems and DSL modems, ISDN adapters, and wired and wireless Ethernet cards, hubs, and routers.

Figure 21:
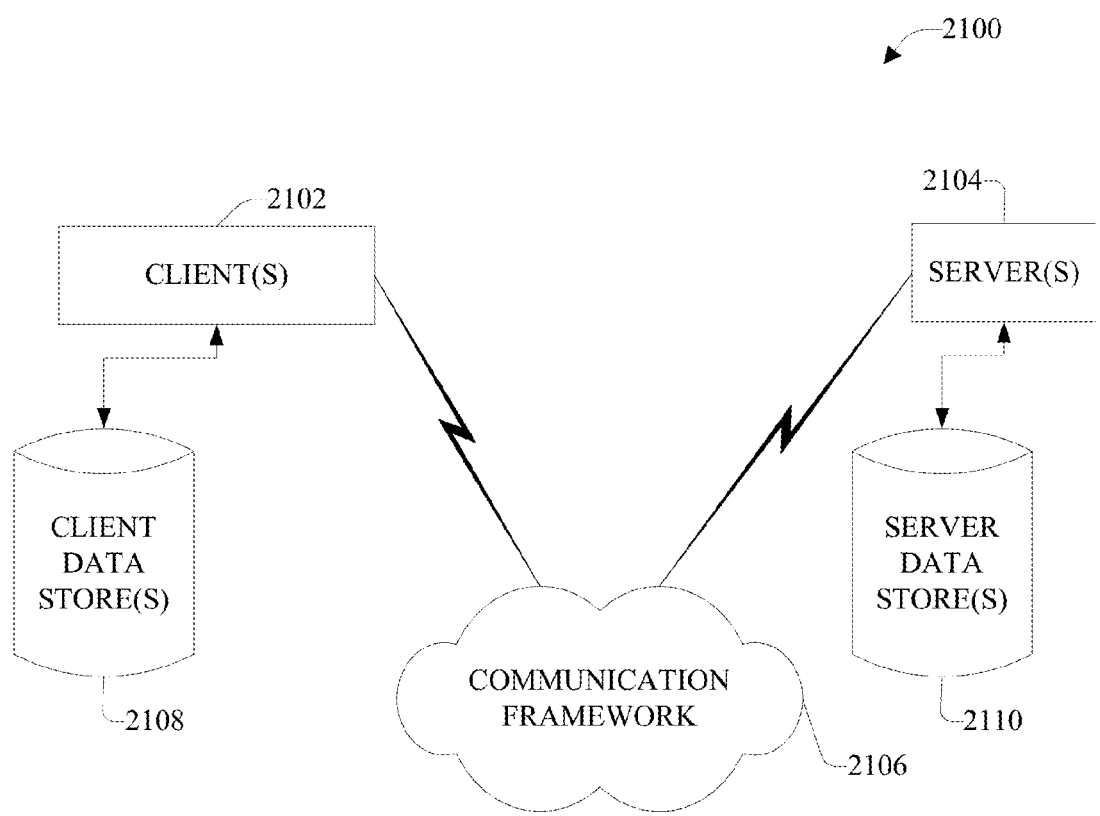
FIG. 21 is an illustration of a schematic diagram of a non-limiting computing environment for implementing one or more embodiments described in this disclosure.

FIG. 21 is an illustration of a schematic diagram of a non-limiting computing environment for implementing one or more embodiments described in this disclosure. Referring now to FIG. 21, there is illustrated a schematic block diagram of a computing environment 2100 for implementation of one or more embodiments described herein. The system 2100 includes one or more client(s) 2102 (e.g., laptops, smart phones, PDAs, media players, computers, portable electronic devices, tablets, and the like). The client(s) 2102 can be hardware and/or software (e.g., threads, processes, computing devices). The system 2100 also includes one or more server(s) 2104. The server(s) 2104 can also be hardware or hardware in combination with software (e.g., threads, processes, computing devices). The servers 2104 can house threads to perform transformations by employing aspects of this disclosure, for example. One possible communication between a client 2102 and a server 2104 can be in the form of a data packet transmitted between two or more computer processes wherein the data packet may include video data. The data packet can include a metadata, e.g., associated contextual information, for example. The system 2100 includes a communication framework 2108 (e.g., a global communication network such as the Internet, or mobile network(s)) that can be employed to facilitate communications between the client(s) 2102 and the server(s) 2104.

Communications can be facilitated via a wired (including optical fiber) and/or wireless technology. The client(s) 2102 include or are operatively connected to one or more client data store(s) 2110 that can be employed to store information local to the client(s) 2102 (e.g., associated contextual information). Similarly, the server(s) 2104 are operatively include or are operatively connected to one or more server data store(s) 2110 that can be employed to store information local to the servers 2104.

In one embodiment, a client 2102 can transfer an encoded file, in accordance with the disclosed subject matter, to server 2104. Server 2104 can store the file, decode the file, or transmit the file to another client 2102. It is to be appreciated, that a client 2102 can also transfer uncompressed file to a server 2104 and server 2104 can compress the file in accordance with the disclosed subject matter. Likewise, server 2104 can encode video information and transmit the information via communication framework 2108 to one or more clients 2102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the one or more of the embodiments described herein. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the embodiments are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that one or more embodiments includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular aspect of an embodiment may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
  a processor; and
  a non-transitory computer-readable storage medium storing computer executable instructions which when executed by the processor cause the processor to perform steps comprising:
    receiving, from a first user device, content;
    receiving a selection of a defined level of security for the received content, wherein the defined level of security indicates a first type of secure environment;
    associating the defined level of security with the received content;
    receiving, from a second user device, a request for the received content;
    determining whether the second user device has the first type of secure environment;
    responsive to determining that the second user device has the first type of secure environment, transmitting the received content to the second user device;
    receiving, from a third user device, a request for a plurality of content including the received content;
    responsive to determining that the third user device does not have the first type of secure environment, removing from the plurality of content the received content to generate a filtered set of content; and
    transmitting to the third user device the filtered set of content.

2. The system of claim 1, wherein the instructions further cause the processor to perform steps comprising:
  responsive to determining that the second user device has a second type of secure environment different from the first type of secure environment, transmitting to the second user device a message indicating that the received content cannot be provided based on the second user device having the second type of secure environment.

3. A method, comprising:
  receiving, by a computer system, content from a first user device;
  receiving, by the computer system, a selection of a defined level of security for the received content, wherein the defined level of security indicates a first type of secure environment;
  associating, by the computer system, the defined level of security with the received content;
  receiving, by the computer system from a second user device, a request for the received content;
  determining, by the computer system, whether the second user device has the first type of secure environment;
  responsive to determining that the second user device has the first type of secure environment, transmitting, by the computer system, the received content to the second user device;
  receiving, by the computer system from a third user device, a request for a plurality of content including the received content;
  responsive to determining that the third user device does not have the first type of secure environment, removing, by the computer system from the plurality of content, the received content to generate a filtered set of content; and
  transmitting, by the computer system to the third user device, the filtered set of content.

4. The method of claim 3, further comprising:
  responsive to determining that the second user device has a second type of secure environment different from the first type of secure environment, transmitting to the second user device a message indicating that the received content cannot be provided based on the second user device having the second type of secure environment.

5. The method of claim 3, wherein the first type of secure environment comprises a hypertext transfer protocol secure environment.

6. The method of claim 3, wherein associating the defined level of security comprises storing the received content with a flag indicating that the defined level of security has been selected for the content.

7. A method comprising:
  associating, by a computer system, a first type of secure environment with stored content;
  receiving, by the computer system from a first user device, a request for the stored content;
  determining, by the computer system, whether the first user device has the first type of secure environment;
  responsive to determining that the first user device has the first type of secure environment, transmitting, by the computer system, the stored content to the first user device;
  receiving, by the computer system from a second user device, a request for a plurality of content including the stored content;
  responsive to determining that the second user device does not have the first type of secure environment, removing, by the computer system from the plurality of content, the stored content to generate a filtered set of content; and transmitting, by the computer system to the second user device, the filtered set of content.

8. A method, comprising:

receiving, by a computer system, information indicating that a defined level of security be associated with content originating from a defined internet domain name, wherein the defined level of security indicates a first type of secure environment;

receiving, by the computer system, content originating from the defined internet domain name;

associating, by the computer system, the defined level of security with the received content based on the received information;

receiving, by the computer system from a first user device, a request for the received content;

responsive to determining that the first user device has the first type of secure environment, transmitting, by the computer system, the received content to the first user device;

receiving, by the computer system from a second user device, a request for a plurality of content including the received content;

responsive to determining that the second user device does not have the first type of secure environment, removing, by the computer system from the plurality of content, the received content to generate a filtered set of content; and transmitting, by the computer system to the second user device, the filtered set of content.

9. A method, comprising:

associating, by a computer system, a type of secure environment and a defined controlled access parameter with stored content;

receiving, by the computer system from a first user device, a request for the stored content;

determining, by the computer system, whether the first user device has the type of secure environment associated with the stored content;

determining, by the computer system, whether the defined controlled access parameter is satisfied by an entity associated with the first user device;

responsive to determining that the first user device has the type of secure environment and the entity satisfies the defined controlled access parameter, transmitting, by the computer system, the stored content to the first user device;

receiving, by the computer system from a second user device, a request for a plurality of content including the stored content;

responsive to determining that the second user device does not have the type of secure environment, removing, by the computer system from the plurality of content, the stored content to generate a filtered set of content; and transmitting, by the computer system to the second user device, the filtered set of content.

10. The method of claim 9, wherein the stored content transmitted to the first user device is encrypted.

11. The method of claim 9, wherein the defined controlled access parameter comprises an identity of the entity.

12. The method of claim 9, wherein the defined controlled access parameter comprises an employment status.

13. The method of claim 3, wherein the defined level of security is a security protocol for exchanging information.

14. The method of claim 13, wherein the selection of the defined level of security indicates that the content only be provided to devices using the security protocol to communicate with the computer system.

15. A non-transitory computer-readable storage medium storing computer executable instructions which when executed by one or more processors cause the one or more processors to perform steps comprising:

receiving content from a first user device;

receiving a selection of a defined level of security for the received content, wherein the defined level of security indicates a first type of secure environment;

associating the defined level of security with the received content;

receiving, from a second user device, a request for the received content;

determining, by the computer system, whether the second user device has the first type of secure environment;

responsive to determining that the second user device has the first type of secure environment, transmitting, by the computer system, the received content to the second user device;

receiving, by the computer system from a third user device, a request for a plurality of content including the received content;

responsive to determining that the third user device does not have the first type of secure environment, removing, by the computer system from the plurality of content, the received content to generate a filtered set of content; and transmitting, by the computer system to the third user device, the filtered set of content.

* * * * *